(12) United States Patent
Baranowski

(10) Patent No.: US 7,099,741 B2
(45) Date of Patent: *Aug. 29, 2006

(54) CONTROL SYSTEMS AND METHODS OF DISPENSING ITEMS

(75) Inventor: John Baranowski, Bensalem, PA (US)

(73) Assignee: Campbell Soup Company, Camden, NJ (US)

(*) Notice: Subject to any disclaimer, the term of this patent is extended or adjusted under 35 U.S.C. 154(b) by 317 days.

This patent is subject to a terminal disclaimer.

(21) Appl. No.: 10/601,675

(22) Filed: Jun. 24, 2003

(65) Prior Publication Data

US 2004/0016765 A1    Jan. 29, 2004

Related U.S. Application Data

(60) Provisional application No. 60/390,363, filed on Jun. 24, 2002, provisional application No. 60/454,645, filed on Mar. 17, 2003.

(51) Int. Cl.
*G06F 17/00* (2006.01)

(52) U.S. Cl. .............. 700/240; 209/592; 209/920; 198/533; 198/752.1; 221/201; 221/202; 221/203; 222/161

(58) Field of Classification Search ........... 209/592, 209/920; 198/752.1, 757, 450, 441, 533; 221/201–204; 222/161; 700/240; 177/25.18
See application file for complete search history.

(56) References Cited

U.S. PATENT DOCUMENTS

| | | | |
|---|---|---|---|
| 3,578,094 A | 5/1971 | Henry et al. | |
| 3,631,903 A | 1/1972 | Huggins | |
| 3,696,584 A | 10/1972 | Rickard | |
| 3,771,574 A | 11/1973 | Creed et al. | |
| 3,782,878 A | * 1/1974 | Hudson | 425/314 |
| 3,796,351 A | 3/1974 | Kohl et al. | |
| 3,822,032 A | 7/1974 | Vergobbi | |
| 3,828,869 A | 8/1974 | Sellers | |
| 3,877,205 A | 4/1975 | Gundersen | |
| 3,938,601 A | 2/1976 | Hobart | |
| 4,004,620 A | 1/1977 | Rosen | |
| 4,053,003 A | 10/1977 | Ferrero et al. | |
| 4,122,876 A | 10/1978 | Nalbach | |
| 4,191,294 A | * 3/1980 | McGrath et al. | 209/135 |
| 4,192,359 A | 3/1980 | Pippin | |
| 4,193,465 A | 3/1980 | Henry | |
| 4,248,027 A | 2/1981 | Cleary et al. | |
| 4,385,670 A | 5/1983 | Braun et al. | |

(Continued)

FOREIGN PATENT DOCUMENTS

DE    900795    1/1954

(Continued)

OTHER PUBLICATIONS

PCT International Search Report (PCT/US03/19729), dated Oct. 29, 2003.

(Continued)

*Primary Examiner*—Gene O. Crawford
*Assistant Examiner*—Jeffrey A. Shapiro
(74) *Attorney, Agent, or Firm*—Baker Botts L.L.P.

(57) ABSTRACT

A control system for regulating a dispenser that includes a feeder bowl and a plurality of dispensing paths is disclosed. The control system includes a control unit for controlling a rotation drive for rotating the dispensing paths, a feeder bowl vibration device for vibrating the feeder bowl, and at least one dispensing path vibration device for vibrating the dispensing paths, such that the feeder bowl receives a plurality of items and supply the items uniformly to each of the dispensing paths, and the dispensing paths dispense the items singularly.

55 Claims, 9 Drawing Sheets

U.S. PATENT DOCUMENTS

| | | | |
|---|---|---|---|
| 4,398,612 A * | 8/1983 | Mikami et al. | 177/25.18 |
| 4,431,070 A | 2/1984 | Andrews | |
| 4,456,117 A | 6/1984 | Szczepanski | |
| 4,516,644 A * | 5/1985 | Fukuda | 177/25.18 |
| 4,527,647 A | 7/1985 | Ueda | |
| 4,534,428 A | 8/1985 | Mosher et al. | |
| 4,534,429 A | 8/1985 | Konishi | |
| 4,540,082 A | 9/1985 | Maddocks | |
| 4,548,287 A * | 10/1985 | Matsuura | 177/25.18 |
| 4,552,236 A | 11/1985 | Mikami | |
| 4,553,616 A * | 11/1985 | Haze | 177/1 |
| 4,561,510 A * | 12/1985 | Sugioka et al. | 177/84 |
| 4,570,419 A | 2/1986 | Tinsley | |
| 4,576,209 A | 3/1986 | Eisenberg | |
| 4,595,125 A | 6/1986 | Alwerud | |
| 4,657,054 A | 4/1987 | Schaltegger | |
| 4,687,672 A | 8/1987 | Vitkovsky | |
| 4,708,215 A | 11/1987 | Nakamura et al. | |
| 4,719,739 A | 1/1988 | Foldesi | |
| 4,721,173 A | 1/1988 | Hirota et al. | |
| 4,723,614 A | 2/1988 | Lahti | |
| 4,733,520 A | 3/1988 | Rabbi | |
| 4,753,275 A | 6/1988 | Schaltegger | |
| 4,784,275 A * | 11/1988 | Fridge | 209/558 |
| 4,844,190 A * | 7/1989 | Mikami et al. | 177/25.18 |
| 4,931,122 A | 6/1990 | Mitchell | |
| 4,999,977 A | 3/1991 | Briscoe et al. | |
| 5,081,822 A | 1/1992 | Boyd et al. | |
| 5,104,002 A | 4/1992 | Cahlander et al. | |
| 5,108,012 A | 4/1992 | Rosso | |
| 5,195,294 A | 3/1993 | Baranowski | |
| 5,195,298 A | 3/1993 | Baranowski | |
| 5,246,118 A | 9/1993 | Mosher | |
| 5,313,508 A | 5/1994 | Ditman et al. | |
| 5,336,032 A * | 8/1994 | Pipes | 414/331.05 |
| 5,355,991 A | 10/1994 | Baranowski | |
| 5,407,057 A | 4/1995 | Baranowski | |
| 5,415,321 A | 5/1995 | Gehlert et al. | |
| 5,454,016 A | 9/1995 | Holmes | |
| 5,454,465 A | 10/1995 | Baranowski | |
| 5,456,931 A | 10/1995 | Egger et al. | |
| 5,458,055 A | 10/1995 | Fitch, Jr. | |
| 5,522,512 A * | 6/1996 | Archer et al. | 209/580 |
| 5,613,590 A * | 3/1997 | Simionato | 198/358 |
| 5,638,417 A | 6/1997 | Boyer et al. | |
| 5,638,657 A | 6/1997 | Archer et al. | |
| 5,692,594 A | 12/1997 | Sidler | |
| 5,726,394 A | 3/1998 | Krämer sen et al. | |
| 5,756,939 A | 5/1998 | Taniguchi | |
| 5,762,113 A | 6/1998 | Ricossa et al. | |
| 5,765,655 A * | 6/1998 | Tatsuoka | 177/25.18 |
| 5,767,455 A | 6/1998 | Mosher | |
| 5,804,772 A | 9/1998 | Wooldridge et al. | |
| 5,829,493 A | 11/1998 | Baranowski | |
| 5,878,865 A | 3/1999 | Bailey et al. | |
| 5,938,074 A | 8/1999 | Dartus | |
| 5,942,732 A | 8/1999 | Holmes | |
| 6,098,785 A | 8/2000 | Van Maanen | |
| 6,268,571 B1 | 7/2001 | Benyukhis | |
| 6,273,238 B1 | 8/2001 | Wooldridge | |
| 6,318,594 B1 | 11/2001 | Hutchins | |
| 6,338,371 B1 | 1/2002 | Araki et al. | |
| 6,351,676 B1 * | 2/2002 | Thomas | 700/28 |
| 6,360,870 B1 | 3/2002 | Wooldridge | |
| 6,421,982 B1 | 7/2002 | Eichenberger | |
| 6,431,407 B1 | 8/2002 | Hogan et al. | |
| 6,772,806 B1 | 8/2004 | DeVillele | |
| 2002/0134050 A1 | 9/2002 | Thieman | 53/412 |
| 2002/0139589 A1 | 10/2002 | Matsuyama et al. | |
| 2004/0007438 A1 * | 1/2004 | Baranowski | 198/459.2 |
| 2004/0007444 A1 * | 1/2004 | Baranowski | 198/757 |
| 2004/0007584 A1 * | 1/2004 | Baranowski | 221/200 |
| 2004/0134758 A1 * | 7/2004 | Baranowski | 198/533 |
| 2004/0134926 A1 * | 7/2004 | Baranowski | 221/92 |
| 2004/0148056 A1 * | 7/2004 | Baranowski | 700/240 |
| 2004/0164088 A1 * | 8/2004 | Baranowski | 221/277 |

FOREIGN PATENT DOCUMENTS

| | | |
|---|---|---|
| EP | 0195428 | 9/1986 |
| EP | 0678738 | 10/1995 |
| WO | 9919215 | 4/1999 |
| WO | 0020306 | 4/2000 |
| WO | 0138202 | 5/2001 |
| WO | 02077582 | 10/2002 |

OTHER PUBLICATIONS

Barry Graham and Paula Madden, Precision Feeding For Coating and Plating Processes, Fastener Technology International (Jun. 2000).

Donald Wooldridge, New Packaging Line For Fastener Kits, Fastener Technology International (Dec. 1997).

Gina Donliu, RTA Hardware Gains Precision Packaging, Furniture Design and Manufacturing (Dec. 1994).

Batching Systems Inc., Labor Savings Drive Auto Parts vf/f/s Bagging, Packaging Digest (Oct. 1996).

Batching Systems Inc., Batching Systems Kit Packaging Systems, Brochure (Feb. 1998).

Batching Systems Inc., Bagmaster® T Series Baggers, Brochure (May 2000).

Batching Systems Inc., Aucillary Equipment Brochure (Feb. 1998).

Batching Systems Inc., Batchmaster® F A W (Fast Automatic Weigher), Brochure (Dec. 1999).

FMC Technologies, Syntron® Material Handling Solutions, Rotary Bowl Feeders, (at least as early as Apr. 2002).

FMC Technologies, Syntron® Material Handling Solutions, Electromagnetic Vibrating Feeders (Light Duty) (at least as early as Jan. 2004).

NTI Ltd., LinMot® Linear Servo Motors, (Jun. 2001).

Quicksilver Controls, Inc., SilverMax™ Fully Integrated Servomotors, Dec. 2001.

Batching Systems Inc., Batch 'n Clamshell Packaging Systems, Brochure (Jul. 2000).

Batching Systems, Inc., Bagmaster® C Series Baggers—Centerfold Web Style Machine, Brochure (Feb. 1998).

Batching Systems, Inc., Bagmaster® F Series Bagger—Flat Web Style Machine, Brochure (Feb. 1998).

Batching Systems, Inc., Batchmaster® Ultra, Brochure (Feb. 1998).

\* cited by examiner

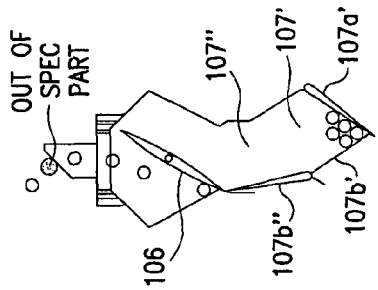
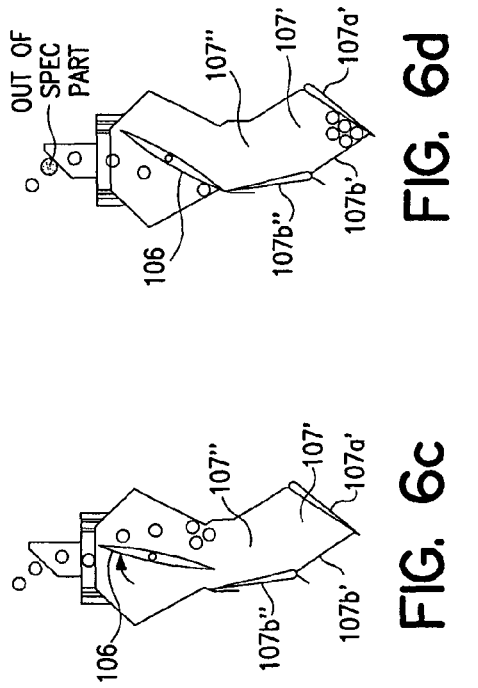
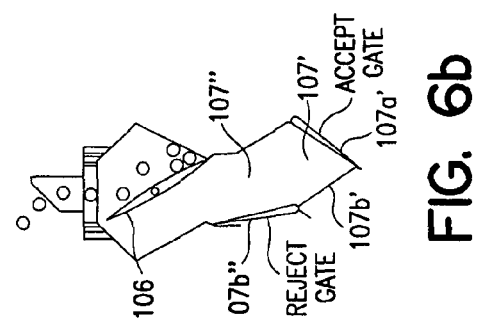
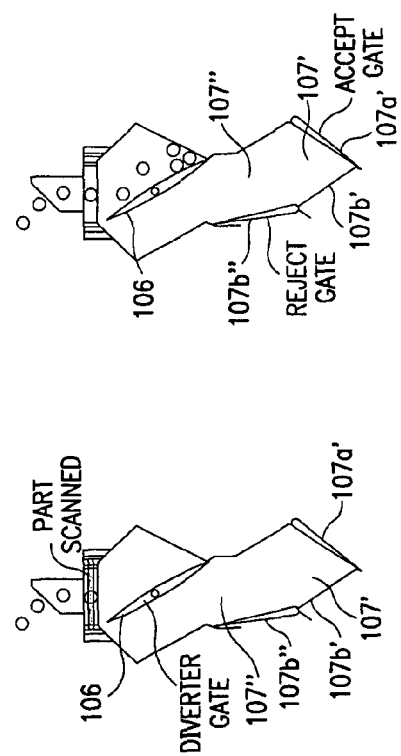
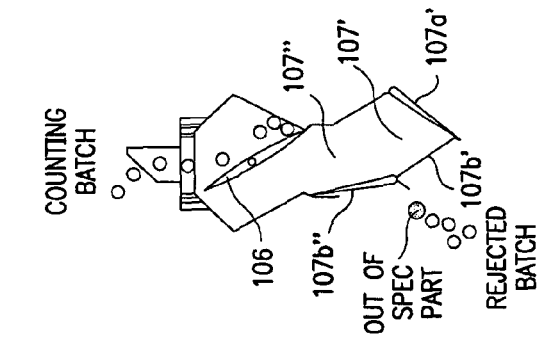
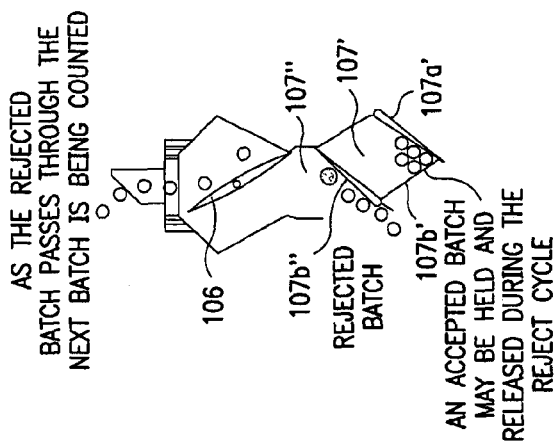
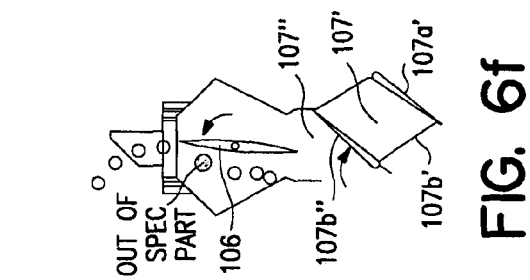
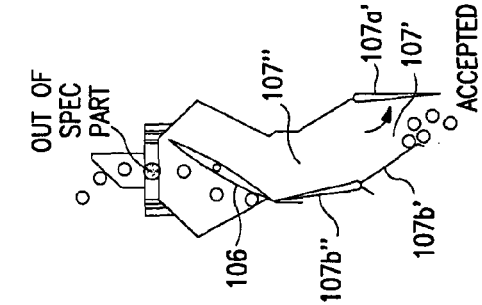

CONTROL SYSTEMS AND METHODS OF DISPENSING ITEMS

This application claims priority from U.S. Provisional Patent Application No. 60/390,363 entitled "Control Systems and Methods of Dispensing Items," and filed on Jun. 24, 2002, and U.S. Provisional Patent Application No. 60/454,645 entitled "Control Systems and Methods of Dispensing Items," and filed on Mar. 17, 2003, the disclosures of which are incorporated herein by reference in their entirety.

BACKGROUND OF THE INVENTION

1. Field of the Invention

The present invention relates generally to control systems and methods of controlling the dispensing of items. In particular, the present invention relates to control systems and methods of controlling the dispensing of items from a vibratory dispenser.

2. Description of Related Art

Known control systems and methods of controlling the dispensing of items may be used to operate dispensers that receive and dispense a plurality of items. Known control systems and methods may operate dispensers, so that dispensers may dispense a plurality of items at different rates. Moreover, known control systems and methods may count dispensed items, so that items may be dispensed in predetermined quantities. Known control systems may measure a physical characteristic of dispensed items, e.g., known control systems may weigh dispensed items.

In known control systems, however, the accuracy of the count of dispensed items may be affected by operation of known dispensers. For example, the ability of known control systems to operate dispensers to dispense items singularly, e.g., in a single file, may improve the accuracy of the count of dispensed items. If two or more items are dispensed simultaneously, known control systems may count the items as a single item, thereby undermining the accuracy of the count of dispensed items. Thus, known dispensing control systems may reduce or limit the rate at which items are dispensed in order to improve the accuracy of a count of dispensed items.

SUMMARY OF THE INVENTION

A need has arisen for dispensing control systems and methods of controlling the dispensing of items, so that a plurality of items may be received and dispensed by a dispenser in a manner that improves the accuracy of a count or a measurement, or both of dispensed items. More specifically, a need has arisen for control systems and methods of controlling the dispensing of items from a rotary, vibratory dispenser, such that items may be dispensed singularly, e.g., in a single file or the like, at greater rates than in known dispensing systems and method.

A further need has arisen for dispensing control systems and methods that may accurately count or measure, or both, items dispensed from a dispenser. For example, a further need has arisen for a control system and method of dispensing items that measures a physical characteristic, e.g., a weight, a volume, a density, or the like, of each dispensed item, so that predetermined quantities of items may be dispensed and so that each item in a predetermined quantity of items may have a measured physical characteristic that is within a predetermined range of measurements.

A dispenser of the present invention may be used to dispense predetermined quantities of a variety of food items, e.g., dried food items, frozen food items, thawed food items, or the like. For example, such a dispenser may dispense dried food items, such as dried pasta, dehydrated vegetables, or the like. Moreover, a dispenser according to the present invention may be used to dispense frozen food items, e.g., frozen meat, frozen vegetables, or the like. The dispenser of the present invention may dispense items of varying physical characteristic, e.g., weight, volume, density, temperature, or the like, including non-food items. For example, the dispenser of the present invention may dispense fasteners, hardware, medical items, electronic parts, mechanical parts, metallic and non-metallic items, or the like.

In an embodiment of the invention, a control system for regulating a rotary, vibratory dispenser comprising a feeder bowl and a plurality of dispensing paths comprises a control unit. The control unit controls each of a rotation drive for rotating the feeder bowl, a feeder bowl vibration device for vibrating the feeder bowl, and at least one dispensing path vibration device for vibrating the dispensing paths, so that the feeder bowl may receive a plurality of items and supply those items uniformly to each of the dispensing paths, and so that the dispensing paths may dispense the items singularly.

In a another embodiment of the invention, a method of controlling the dispensing of items comprises the steps of delivering items onto a feeder bowl at a predetermined rate of delivery, rotating a feeder bowl at a predetermined rotational speed, vibrating the feeder bowl at a predetermined feeder bowl vibrational setting, so that the items are dispensed uniformly to a plurality of dispensing paths positioned around the feeder bowl, and vibrating the dispensing paths at a predetermined dispensing path vibrational setting, so that the dispensing paths dispense the items singularly.

In yet another embodiment of the present invention, a control system for regulating a dispenser which comprises a feeder bowl and a plurality of dispensing paths comprises a control unit. The control unit controls a rotation drive for rotating the dispensing paths, a feeder bowl vibration device for vibrating the feeder bowl, and at least one dispensing path vibration device for vibrating the dispensing paths, such that the feeder bowl receives a plurality of items and supply the items uniformly to each of the dispensing paths, and the dispensing paths dispense the items singularly.

Other objects, features, and advantages of embodiments of the present invention will be apparent to persons of ordinary skill in the art from the following description of preferred embodiments with reference to the accompanying drawings.

BRIEF DESCRIPTION OF DRAWINGS

The present invention may be understood more readily with reference to the following drawings.

FIGS. 6a–6h show an operation of a dispensing head according to an embodiment of the present invention.

DETAILED DESCRIPTION OF PREFERRED EMBODIMENTS

Figure 1:
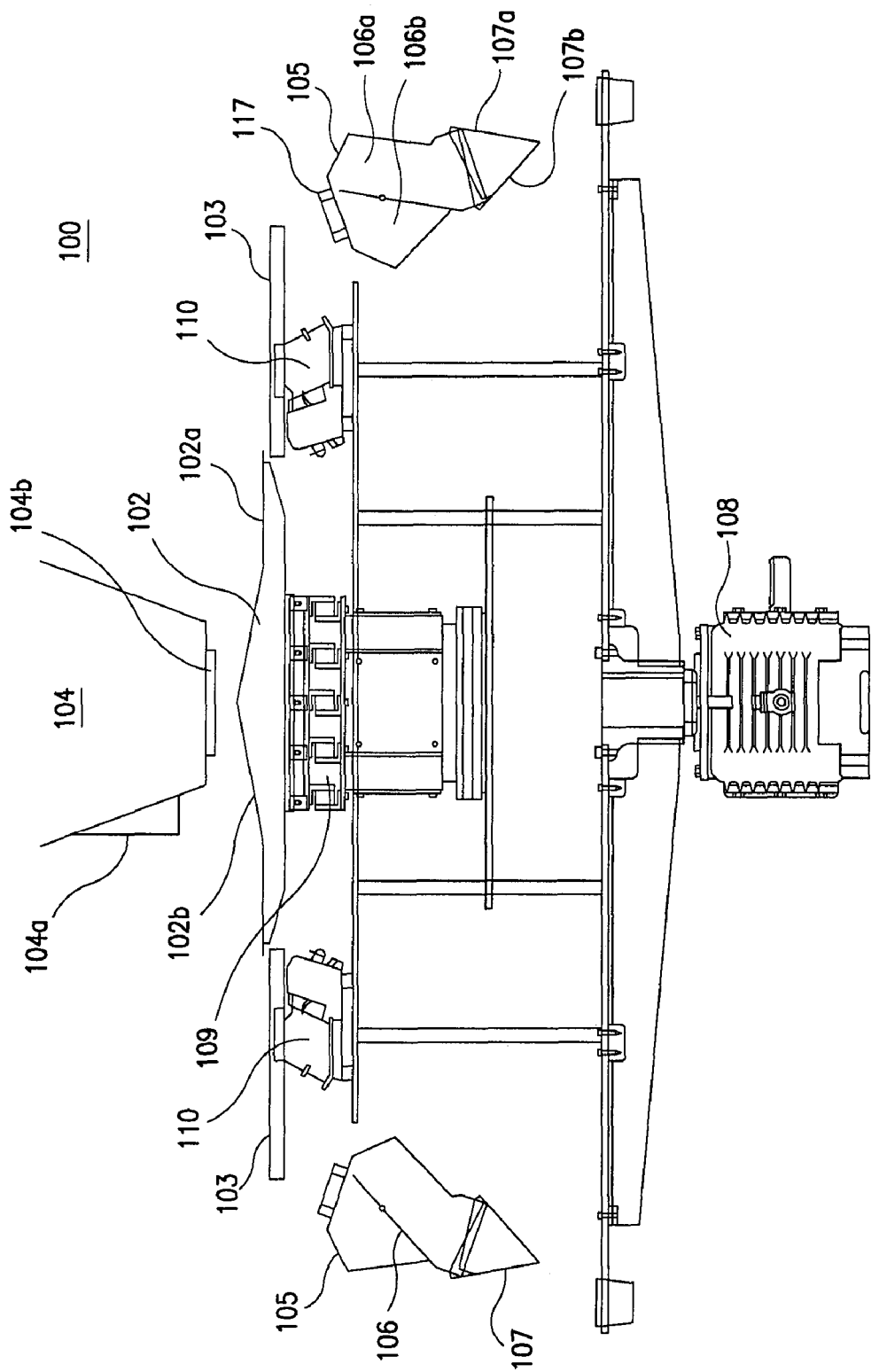
FIG. 1 shows a rotary, vibratory dispenser for use with a control system, according to an embodiment of the present invention.

As shown in FIG. 1, a rotary, vibratory dispenser 100 for use with the control system of the present invention includes a feeder bowl 102 for receiving a plurality of items to be dispensed from rotary, vibratory dispenser 100, a plurality of dispensing paths 103 positioned around feeder bowl 102 for receiving items supplied by feeder bowl 102, a feeder bowl rotation drive 108 for rotating feeder bowl 102, a feeder bowl vibration device 109 for vibrating feeder bowl 102, and one or more dispensing path vibration devices 110 for vibrating each dispensing paths 103, so that dispensing paths 103 may dispensing items singularly, sensing units 117 for measuring a physical characteristic, e.g., a volume, a weight, a density, or the like, of each singularly-dispensed item, and dispensing heads 105 for receiving items dispensed from each dispensing path 103 and for directing predetermined quantities of items to containers. A bulk delivery apparatus 104, e.g., a hopper, a conveyor, or the like, may deliver items to rotary, vibratory dispenser 100, e.g., to feeder bowl 101 of rotary, vibratory dispenser 100.

Rotary, vibratory dispenser 100 may be used to receive and dispense a variety of food items, e.g., dried food items, frozen food items, thawed food items, or the like. For example, rotary, vibratory dispenser 100 may dispense dried food items, such as dried pasta, dehydrated vegetables, or the like. Moreover, rotary, vibratory dispenser 100 may be used to dispense frozen food items, e.g., frozen meats, frozen vegetables, or the like. Rotary, vibratory dispenser 100 may be used to dispense items of varying physical characteristic, e.g., varying weight, volume, density, temperature, or the like, including non-food items of varying physical characteristic. For example, the rotary, vibratory dispenser may dispense fasteners, hardware, medical items, electronic parts, mechanical parts, metallic and non-metallic items, or the like.

Figure 2A:
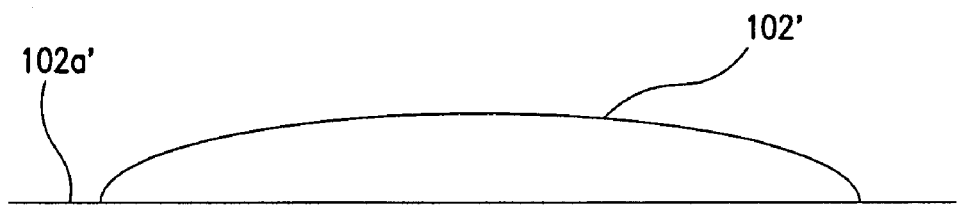
FIG. 2a shows a cross-sectional view of a dome-shaped feeder bowl according to an embodiment of the present invention.
Figure 2B:
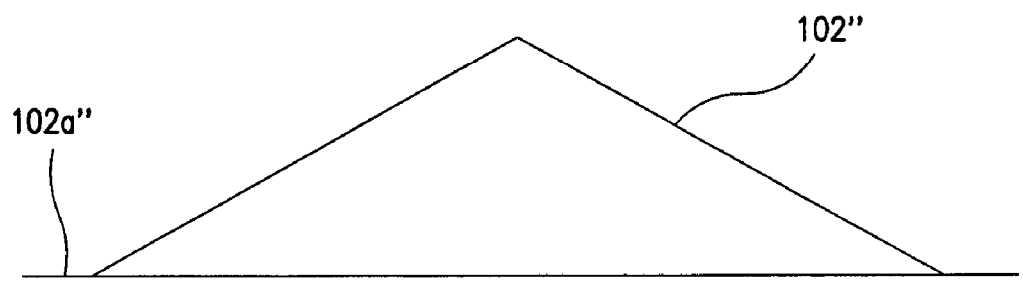
FIG. 2b shows a cross-sectional view of a conical-shaped feeder bowl according to an embodiment of the present invention.

FIG. 1 shows a feeder bowl 102 with an attenuated conical shape and a flat peripheral edge 2a. Feeder bowl 102 may be substantially dome-shaped, substantially conical-shaped, substantially flat, or the like (not shown). Each configuration of feeder bowl may include a flat peripheral edge. FIG. 2a shows a cross-section of a dome-shaped feeder bowl 102' with a substantially planar peripheral edge 102a'. FIG. 2b shows a cross-section of a conical-shaped feeder bowl 102" with a substantially planar peripheral edge 102a".

Figure 2C:
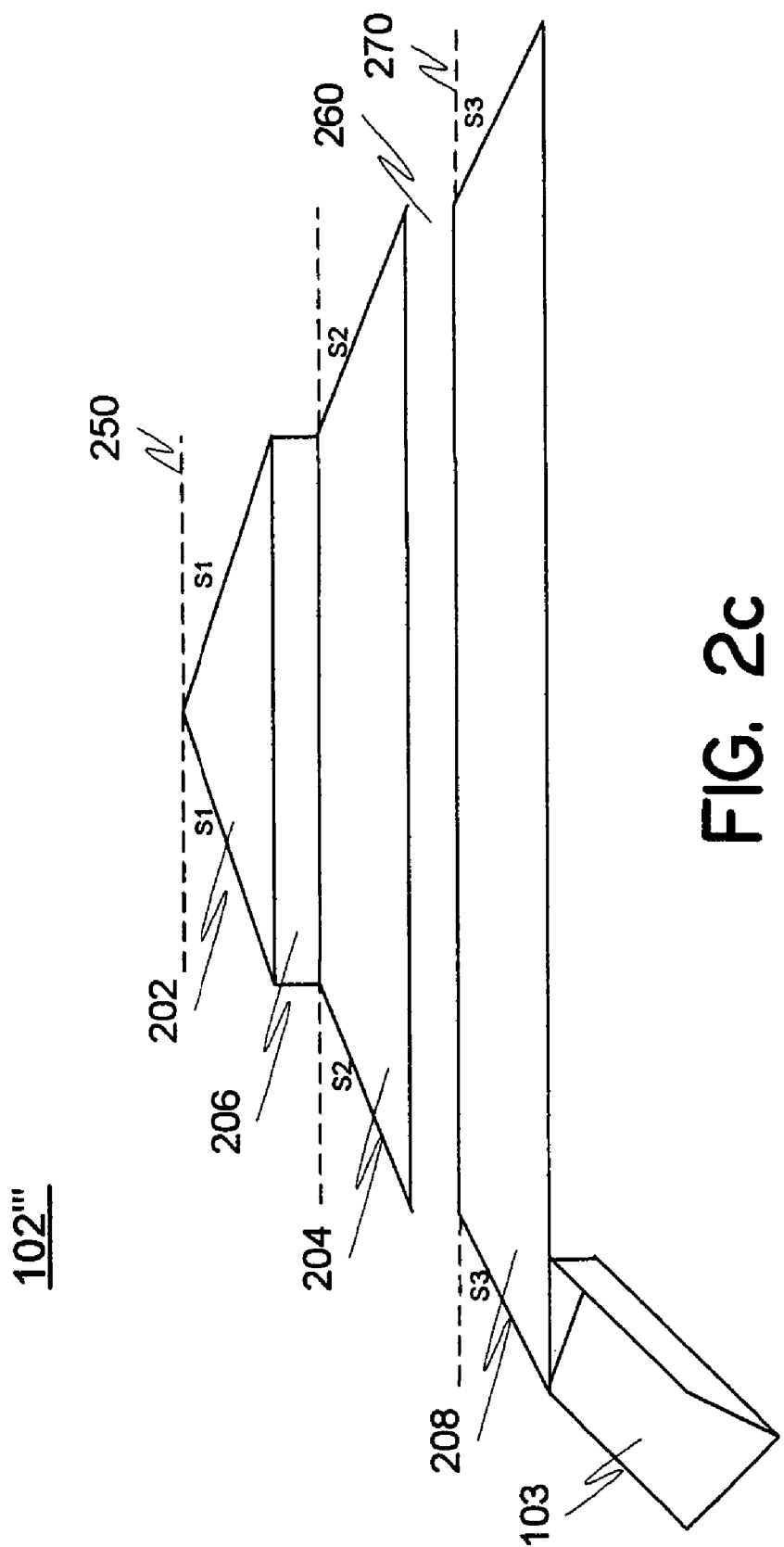
FIG. 2c shows a cross-sectional view of a sloped feeder bowl according to an embodiment of the present invention.

FIG. 2c shows a feeder bowl 102''' according to yet another embodiment of the present invention. Feeder bowl 102''' may comprise a plurality of sloped portions, and each of the sloped portions may be separated by a substantially cylindrical portion. For example, feeder bowl 102''' may comprise a first sloped portion 202 and a second sloped portion 204 connected to first sloped portion 202 via a substantially cylindrical portion 206. Cylindrical portion 206 may form a vertical drop between first sloped portion 202 and second sloped portion 204. In an embodiment, a thickness of cylindrical portion 206 may be selected, such that a distance between first sloped portion 202 and second sloped portion 204 is about 25.4 mm (about 1 inch). Moreover, first sloped portion 202, second sloped portion 204, and substantially cylindrical portion 206 may be stationary portions, i.e., non-rotating portions, or vibratory portions, or both. First sloped portion 202 and second sloped portion 204 may gradually accelerate the fall of items dispensed by bulk delivery apparatus 106 to feeder bowl 102'''. Specifically, a slope S1 of second sloped portion 204 may be greater than a slope S2 of first sloped portion 202, such that an item's speed increases between first sloped portion 202 and second sloped portion 204. In a preferred embodiment, first sloped portion 202 may be inclined in a downward direction relative to a first horizontal plane 250, and slope S1 of first sloped portion 202 may be about 9.5° relative to first horizontal plane 250. Moreover, second sloped portion 204 may be inclined in a downward direction relative to a second horizontal plane 260 which is parallel to first horizontal plane 250, and slope S2 of second sloped portion 204 may be about 12° relative to second horizontal plane 260. This preferred embodiment achieved superior performance with most items tested. Nevertheless, in yet another embodiment, slope S1 of first sloped portion 202 and slope S2 of second sloped portion 204 may be varied, depending on the type of item dispensed from bulk delivery apparatus 106.

Feeder bowl 102''' also may comprise a sloped member 208 fixed to dispensing paths 102, such that sloped member 208 may rotate with dispensing paths 102. Sloped member 208 may be separate from second sloped portion 204, such that a gap 210 is formed between second sloped portion 204 and sloped member 208. In an embodiment, sloped member 208 may be inclined in a downward direction relative to a third horizontal plane 270 which is parallel to second horizontal plane 260. In operation, items fall from second sloped portion 204 onto the surface of sloped member 208 and, subsequently may become airborne. A slope S3 of sloped member 208 relative to third horizontal plane 270 may be selected to reduce the amplitude of the airborne items. For example, slope S3 of sloped portion 208 may be between about 1° and about 15°, and in a preferred embodiment, slope S3 of sloped portion 208 is about 15°. Moreover, dispensing paths 103 may be inclined in a downward direction, such that a slope of dispensing paths 103 is about the same as slope S3 of sloped member 208. Although in FIG. 2c sloped member 208 is depicted as a single portion member, sloped member may be divided into a plurality of sloped portions having varying slopes, such as described above with respect to first sloped portion 202, second sloped portion 204, and substantially cylindrical portion 206.

Referring again to FIG. 1, dispensing paths 103 may be positioned around feeder bowl 102, e.g., around a periphery of feeder bowl 102. Dispensing paths 103 may receive items supplied by feeder bowl 102. As described in more detail below, dispensing paths 103, in turn, operate to position items in single file along a longitudinal axis of each dispensing path 103, so that dispensing paths 103 may dispense items singularly from a distal end of each dispensing path 103. Moreover, each dispensing path 103 may include one or more item-dispensing channels (not shown) for dispensing the items singularly from each channel.

A bulk delivery apparatus 104 may be used to deliver items to rotary, vibratory dispenser 100. Bulk delivery apparatus 104 may be positioned adjacent to rotary, vibratory dispenser 100, as shown in FIG. 1, to deliver items to rotary, vibratory dispenser 100, e.g., to feeder bowl 102 of rotary, vibratory dispenser 100. Bulk delivery apparatus 104 may include a, e.g., a vibration device, a motor, or the like, for controlling a rate of delivery of items from bulk delivery apparatus 104 to rotary, vibratory dispenser 100. Adjustment of enables adjustment of the rate of delivery of items from bulk delivery apparatus 104.

As shown in FIG. 1, bulk delivery apparatus 104 may include a hopper 104 and hopper vibration device 104a for vibrating hopper 104, so that items may be delivered at different rates to feeder bowl 102 of rotary, vibratory dispenser 100. Such hopper vibration devices 104a may include Syntron® Electromagnetic Vibrators, which are available from FMC Technologies Material Handling Solutions of Homer City, Pa. Other hoppers 104 and hopper vibration devices 104a may include the Skako Comassa Feeders, which are available from Skako, Inc. of Faaborg, Denmark.

In another embodiment of the invention, bulk delivery apparatus 104 may include a conveyor or the like for delivering items to feeder bowl 102 of rotary, vibratory dispenser 100. In a further embodiment of the invention, the rate of delivery of items from bulk delivery apparatus 104 to rotary, vibratory dispenser 100 may be regulated by adjusting an aperture, or the like, of bulk delivery apparatus 104.

Bulk delivery apparatus 104 may include a sensing unit 104b for counting or measuring items delivered from bulk delivery apparatus 104 to feeder bowl 102. Sensing unit 104b may include a scale, e.g., a strain gauge, for weighing items in bulk delivery apparatus 104 and for determining a weight of items delivered from bulk delivery apparatus 104 to feeder bowl 102 in a given time period. Sensing unit 104b may include one or more optic sensors, infrared sensors, electromagnetic radiation sensors, proximity sensors, capacitative sensors, or the like, such as are available from IFM Efector, Inc., Exton, Pa. Sensing unit 104b may be positioned at bulk delivery apparatus 106 to count, e.g., to sense or the like, items dispensed from bulk delivery apparatus, so that bulk delivery apparatus 104 may deliver items to rotary, vibratory dispenser 100 at a rate sufficient to enable rotary, vibratory dispenser 100 to dispense a predetermined number of items to containers or the like at a desired rate, e.g., at a desired number of containers per minute, or the like.

Dispensing paths 103 may be positioned around feeder bowl 102 to receive items supplied by feeder bowl 102. Dispensing paths 103 may be positioned around a periphery of feeder bowl 102 and extend radially from the periphery of feeder bowl 102, as shown in FIG. 1, to receive items supplied by feeder bowl 102. The length of each dispensing path 103 may vary depending upon a variety of factors, such as the space available for the rotary, vibratory dispenser, a physical characteristic of items to be dispensed, a desired dispensing rate, a rotational speed of the dispensing paths 103, or the like. The number of dispensing paths 103 may vary. For example, forty-eight (48) dispensing paths 103 may be positioned around feeder bowl 102. According to one embodiment of the invention, one hundred (100) dispensing paths 103 may be positioned around feeder bowl 102. In another embodiment of the invention, twelve dispensing paths 103 may be positioned around feeder bowl 102. However, any number of dispensing paths 103 may be positioned around feeder bowl 102.

Each dispensing path 103 may comprise one or more item-dispensing channels, each of which channels may receive items supplied by feeder bowl 102 and dispense items singularly. For example, each dispensing path 103 may comprise a single channel. However, each dispensing path 103 may include two or more channels, each of which channels may dispense items singularly to a dispensing head 105. Thus, according to an embodiment of the invention in which rotary, vibratory dispenser 100 is configured with forty-eight (48) dispensing paths 103 and each dispensing path 103 includes two channels, rotary, vibratory dispenser 100 may dispense items from each of the ninety-six (96) channels. The number of channels may vary depending upon the number of containers to be filled at a rotary, vibratory dispenser, the number of dispensing heads 105 and sensing units 117, or the like.

Figure 4A:
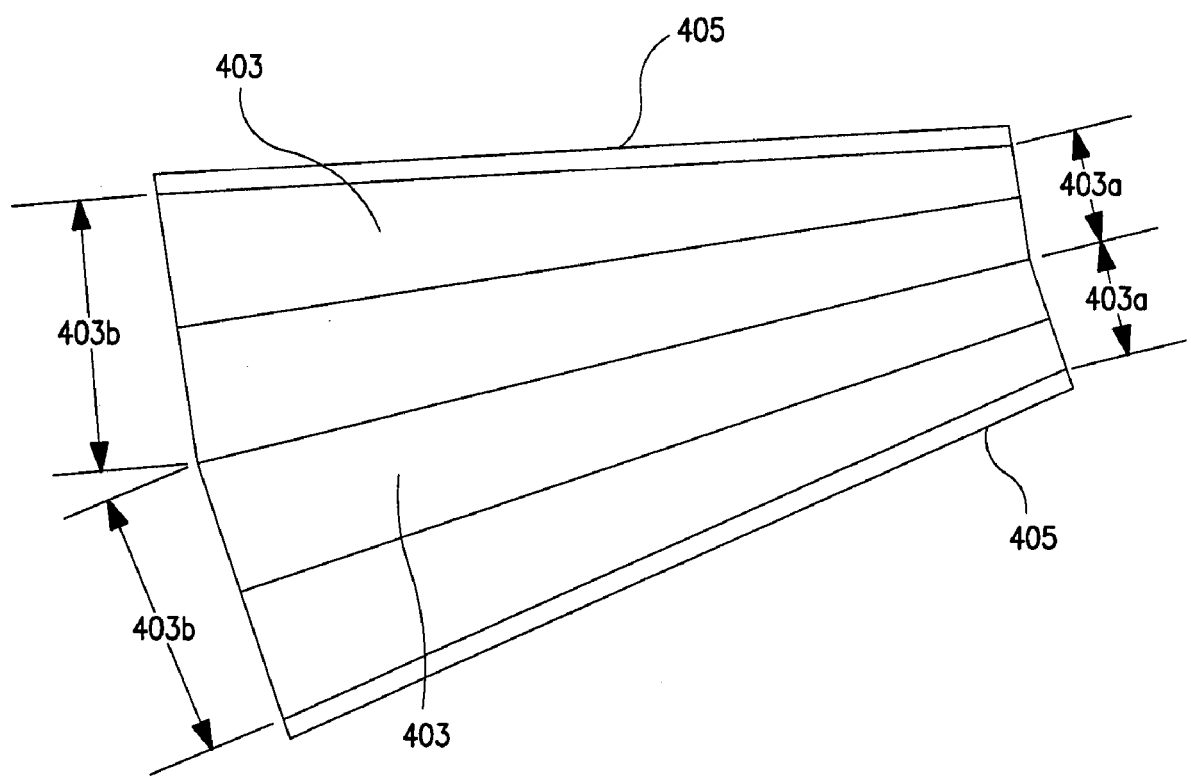
FIG. 4a shows a top view of a channel according to the present invention.

Each channel may have a substantially constant width and extend radially from feeder bowl 102, as shown in FIG. 1. FIG. 4a shows a pair of channels 403 of increasing width. Each channel 403 has a portion of narrower width 403a at one end and a portion of greater width 403b at another end. The portion of narrower width 403a of each channel 403 may be positioned adjacent to feeder bowl 102 to receive items supplied from feeder bowl 102. Depending upon the number of channels 403 positioned around feeder bowl 102 and the dimensions of each channel 403, outer edges 405 of adjacent channels 403 may contact. In this way, the plurality of channels 403 may form a continuous item-dispensing surface extending from a periphery of feeder bowl 102 to receive a plurality of items supplied by feeder bowl 102.

Figure 4B:
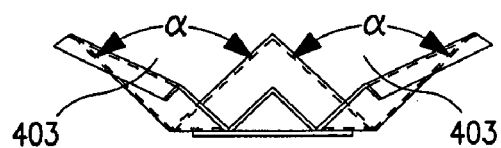
FIG. 4b shows an end view of the channel of FIG. 4a, according to the present invention.
Figure 4C:
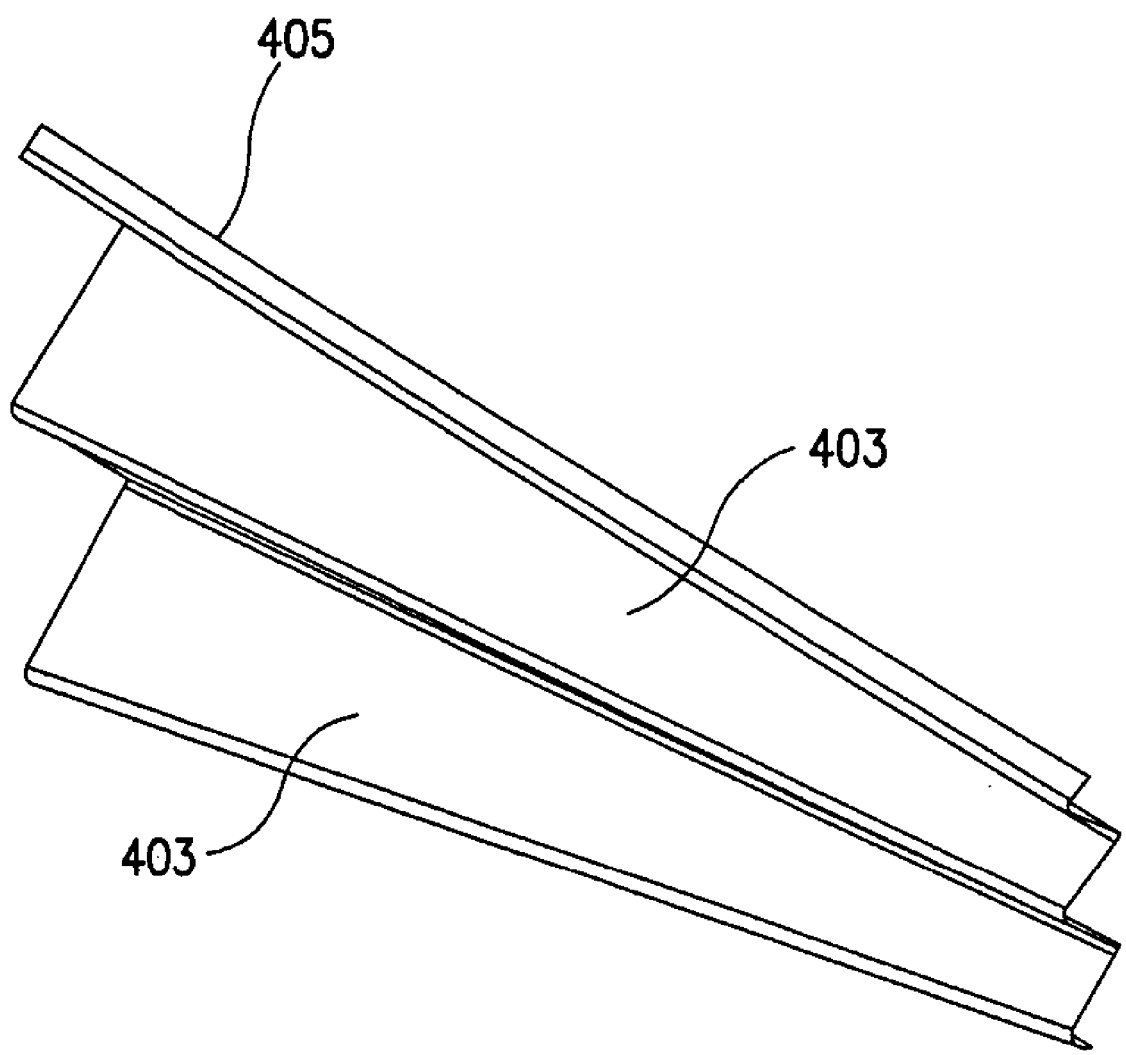
FIG. 4c shows a perspective view of the channel of FIG. 4a, according to the present invention.

Each channel 403 may have a substantially V-shaped cross-section, such that a pair of channels 403 may have a substantially W-shaped cross-section, as shown in FIGS. 4b and 4c. Each channel may have a U-shaped, so that a pair of such channels has a double-U-shaped cross-sectional configuration. Further, a depth of each channel 403 may increase as each channel 403 extends from a portion of narrower width 403a to a portion of greater width 403b, as shown in FIG. 4c. Thus, a depth of each channel 403 may increase as each channel 403 extends radially from a periphery of feeder bowl 102.

The angle of offset α of adjacent sides of a channel 403 may vary, as well. For example, the angle of offset α may be about 90°, as shown in FIG. 4b. However, the angle of offset α may be an acute angle or an obtuse angle, depending upon a physical characteristic, e.g., a weight, a volume, a density, or the like, of items to be dispensed. The cross-sectional configuration, depth, and angle of offset α of each channel 403 may vary according to a physical characteristic of items to be dispensed, so that each channel 403 may receive a plurality of items supplied by feeder bowl 102, sort the items into a single file as the items travel along each channel 403, and dispense the items singularly from a distal end of each channel 403 to improve the accuracy of a count or a measurement or both of each dispensed item.

A sensing unit 117 may be positioned at each dispensing path 103 of rotary, vibratory dispenser 100 to measure a physical characteristic, e.g., a weight, a volume, a density, or the like, or each item dispensed from a dispensing path 103. In embodiments of the invention in which a dispensing path 103 may include two or more item-dispensing channels, a sensing unit 117 may be positioned at each channel, e.g., at a distal end of each channel of a dispensing path 103, so that each sensing unit 117 may measure a physical characteristic of each item dispensed from each channel, so that an accurate count of dispensed items may be obtained. As shown in FIG. 1, a sensing unit 117 may be positioned at each dispensing head 105, e.g., at an opening of each dispensing head 105.

Sensing unit 117 may include optic sensors, infrared sensors, capacitative sensors, photoelectric sensors, laser sensors, fiber optic sensors, proximity sensors, or the like, such as are available from IFM Efector, Inc., Exton, Pa. For example, capacitative sensors may detect the presence of conductive and non-conductive items, so that an accurate count may be made of items dispensed from each dispensing path 103 or channel. Optic sensors may detect each item as items are dispensed from each dispensing path 103 or channel. A sensing unit 117 according to this embodiment of the invention may be positioned at a distal end of each item-dispensing channel for counting each item dispensed from each channel.

Sensing unit 117 may include a scale, or the like, for measuring a weight of each item dispensed from each channel. In another embodiment of the invention, sensing unit 117 may include an optic sensor or an electromagnetic radiation sensor, such as those available from Batching Systems, Inc., Prince Frederick, Md., for measuring a volume of each dispensed item. Each electromagnetic radiation sensor may include a source of electromagnetic radiation directed onto an electromagnetic radiation detector, so that a volume of each item passing between the electromagnetic radiation source and electromagnetic radiation detector may be determined based on fluctuations in the amount of electromagnetic radiation detected as each item passes between the electromagnetic radiation source and the electromagnetic radiation detector.

According to a still further embodiment of the present invention, each sensing unit 117 may include a pair of sensing units. For example sensing unit 117 may include a scale and an electromagnetic sensor for measuring a weight and a volume, respectively, of each dispensed item. Sensing unit 117 may include an optical or proximity sensor and a scale for counting and measuring a weight, respectively, of each dispensed item. Thus, such a dual sensing unit may further improve the accuracy of a count, or a measurement, or both of each dispensed item.

A dispensing head 105 may be positioned at each dispensing path 103, e.g., adjacent to a distal end of each dispensing path 103, to receive items dispensed from each dispensing path 103 and its associated item-dispensing channel. In embodiments of the invention in which a dispensing path 102 may include more than one item-dispensing channel, a dispensing head 105 may be positioned adjacent to each channel, e.g., adjacent to a distal end of each channel of a dispensing path 102, to receive items dispensed from each channel.

Dispensing head 105 may include a bifurcation device 106 for directing received items to a first chamber 106a or a second chamber 106b of each dispensing head 105. Moreover, each dispensing head 105 may include a holding chamber 107. Holding chamber 107 may be positioned at a lower portion of each dispensing head 105. Holding chamber 107 may be selectively reconfigured to direct items within dispensing head 105 in a first direction, e.g., toward a container or the like, or to divert items in a second direction, e.g., away from a container or the like. In one embodiment of the present invention, holding chamber 107 may include a pair of doors 107a, 107b, as shown in FIG. 1.

Referring to FIGS. 6a–6h, in a modification of this embodiment of the present invention, holding chamber 107 may be replaced by a first holding chamber 107' and a second holding chamber 107", door 107a may be replaced by a first door 107a', and door 107b may be replaced by a guide wall 107b' and a second door 107b". First holding chamber 107' may be positioned below second holding chamber 107", and when second door 107b" is in a closed position, holding chambers 107' and 107" may form a continuous chamber. Nevertheless, when second door 107b" is in an open position, second door 107b" may prevent the items from reaching first holding chamber 107'. Specifically, bifurcation device 106 may receive the items which pass through the opening in dispensing head 117, such that the items are positioned within first chamber 106a or second chamber 106b. When bifurcation device 106 receives a predetermined number of items which have acceptable physical characteristics, e.g., physical characteristics which are within a predetermined range of physical characteristics, bifurcation device 106 may direct the received items into first holding chamber 107' via second holding chamber 107". First door 107a' then may move from a closed positioned to an open position, such that the items received by first holding chamber 107' are directed toward the container. Nevertheless, if bifurcation device 106 receives any item which does not have acceptable characteristics, e.g., physical characteristics which are greater than or less than the predetermined range of physical characteristics, second door 107b" may move from the closed position to the open position, and bifurcation device 106 subsequently may direct the received items into second holding chamber 107". When bifurcation device 106 directs the received items into second holding chamber 107", bifurcation device 106 may receive new items, such that the new items may be positioned within first chamber 106a or second chamber 106b. Moreover, when the received items reach second holding chamber 107", second door 107b" may direct the received items away from the container. Consequently, when bifurcation device 106 receives an unacceptable item, each of the items received by the bifurcation device 106 may be directed away from the container without having to wait for bifurcation device 106 to receive the predetermined number of items. Moreover, the new items may be received by bifurcation device 106 without having to wait for second door 107b" to direct the received items away from the container.

Referring again to FIG. 1, in another embodiment of the present invention, holding chamber 107 may include two pairs of doors for directing items to a container or for diverting items away from a container. Based on a measurement and count of each dispensed item by sensing units 117, each dispensing head 105 may be activated to direct predetermined quantities of items, each of whose measured physical characteristics is within a predetermined range of measurements, to a container or the like. Moreover, based on measured values of each dispensed item, dispensing heads 105 may direct predetermined volumes, weights, or the like, to a container. Dispensing heads 105 may be activated to divert dispensed items whose measured physical characteristic is greater than or less than a predetermined range of measurements away from a container or the like.

Feeder bowl rotation drive 108 may rotate feeder bowl 102 at different rotational speeds. Moreover, feeder bowl rotation drive 108 may rotate feeder bowl 102 and dispensing paths 103 at a rotational speed that corresponds to a desired rate of filling containers at rotary, vibratory dispenser 100. For example, feeder bowl rotation drive 108 may rotate a frame that supports feeder bowl 102 and dispensing paths 103, as shown in FIG. 1. If rotary, vibratory dispenser 100 includes 48 dispensing paths 103 and each dispensing path 103 includes two item-dispensing channels, and rotary, vibratory dispenser 100 must fill 480 containers per minute, feeder bowl rotation drive 103 may rotate feeder bowl 101 and dispensing paths 103 at five (5) revolutions per minute (rpm), so that rotary, vibratory dispenser may dispense items to 480 containers per minute. If each dispensing path 103 include a single item-dispensing channel, feeder bowl rotation drive 108 may rotate feeder bowl 102 and dispensing paths 103 at ten (10) ten rpm, so that rotary, vibratory dispenser 100 may dispense items to 480 containers per minute.

According to an embodiment of the invention in which dispensing paths 103 may rotate independently of feeder bowl 102, feeder bowl rotation drive 108 may rotate dispensing paths 103 at a substantially similar rotational speed as feeder bowl 102, or feeder bowl rotation drive 108 may rotate dispensing paths 103 at a different rotational speed than feeder bowl 102, e.g., via a transmission (not shown), so that a rotational speed of dispensing paths 103 may be varied relative to a rotational speed of feeder bowl 102. In a still further embodiment of the invention, feeder bowl rotation drive 108 may rotate dispensing paths 103 in a direction of rotation that is opposite to a direction of rotation of feeder bowl 102. In each embodiment, feeder bowl rotation drive 108 may rotate dispensing paths 103 at a rotational speed that corresponds to a desired rate of filling containers at rotary, vibratory dispenser 100.

Feeder bowl vibration device 109 may vibrate feeder bowl 102 at different vibrational settings, e.g., at different vibrational magnitudes, at different vibrational frequencies, in different vibrational planes, or combinations thereof. Feeder bowl vibration device may vibrate feeder bowl at different vibrational settings in a first plane, a second plane, or both, so that feeder bowl 102 may supply items uniformly to each of the dispensing paths 103 positioned around feeder bowl 102. First plane may be generally vertical, while second plane may be generally horizontal, or first plane may be transverse to second plane. Such feeder bowl vibration devices 109 may include Syntron® Electromagnetic Vibrators, available from FMC Technologies Material Handling Solutions of Homer City, Pa.

By selectively vibrating feeder bowl 102 at different vibrational settings, feeder bowl vibration device 109 enables feeder bowl 102 to receive a plurality of items, e.g., from a bulk delivery apparatus 104, and to supply those items uniformly to each of the dispensing paths 103 positioned around feeder bowl 102. Moreover, feeder bowl vibration device 109 may vibrate feeder bowl 102 at different vibrational settings that are proportionate to a physical characteristic of each item, e.g., a weight, a density, a volume, a temperature, or the like of each item. Depending upon a physical characteristic of each item, e.g., a weight, a density, a volume, a temperature, or the like, a rate at which items are delivered to feeder bowl 102, and a desired rate of supplying items from feeder bowl 102 to dispensing paths 103, feeder bowl vibration device 109 vibrates feeder bowl 102 at different vibrational settings, so that feeder bowl 102 may supply items uniformly to each dispensing path 103.

One or more dispensing path vibration devices 110 may vibrate each dispensing path 103, e.g., each channel of each dispensing path 103. Dispensing path vibration devices 110 may vibrate each dispensing path 103 and channel at different vibrational settings, e.g., at different vibrational magnitudes, at different vibrational frequencies, in different vibrational planes, or combinations thereof. Each dispensing path vibration device 110 may vibrate one or more dispensing paths 103 and associated item-dispensing channels at different vibrational settings in a first plane or a second plane or both. First and second plane may be a generally horizontal and a generally vertical plane, respectively, or first and second planes may be transverse to one another. Such dispensing path vibration devices 110 may include Syntron® Solid Mount Linear Drives, which are available from FMC Technologies Material Handling Solutions of Homer City, Pa.

By vibrating each dispensing path 103 at different vibrational settings, dispensing path vibration devices 110 enable each dispensing path 103 to receive a plurality of items supplied from feeder bowl 102, to singulate items, e.g., to position items in single file along a longitudinal axis of each dispensing path 103, and to dispense the items singularly from each dispensing path 103. Moreover, dispensing path vibration devices 110 may vibrate each dispensing path 103, according to a physical characteristic, e.g., a weight, a density, a volume, a temperature, or the like of each item, so that each dispensing path 103 dispenses items singularly, e.g., in single file, in a spaced relation, or the like. Depending upon a physical characteristic of each item, e.g., a weight, a density, a volume, a temperature, or the like, a rate at which items are supplied by feeder bowl 102 to dispensing paths 103, and a desired rate of dispensing items from each dispensing path 103, dispensing path vibration devices 110 may vibrate each dispensing path 103 at vibrational settings, so that each dispensing path 103 may dispense items singularly.

A separate dispensing path vibration unit 110 may vibrate each dispensing path 103 and associated channel(s) independently of every other dispensing path 103, e.g., at different vibrational settings, and independently of a vibration of feeder bowl 102 by feeder bowl vibration device 109. In another embodiment of the invention, each dispensing path vibration unit 110 may vibrate two or more dispensing paths 103 and associated channels at similar vibrational settings. If each dispensing path 103 includes two or more item-dispensing channels, a dispensing path vibration unit 110 may vibrate two or more channels of a respective dispensing path 103 at a similar vibrational setting, or dispensing path vibration device 110 may vibrate each channel of a dispensing path 103, e.g., one, two, three, four, or more channels of a respective dispensing path 103 at a similar vibrational settings, e.g., in or along similar vibrational axes, at similar vibrational magnitude, at similar vibrational frequencies, or combinations thereof. Moreover, dispensing path vibration devices 110 may vibrate each dispensing path 103 independently of other dispensing paths 103, so that each dispensing path 103 may receive items supplied by feeder bowl 102 and dispensing items singularly.

Figure 3:
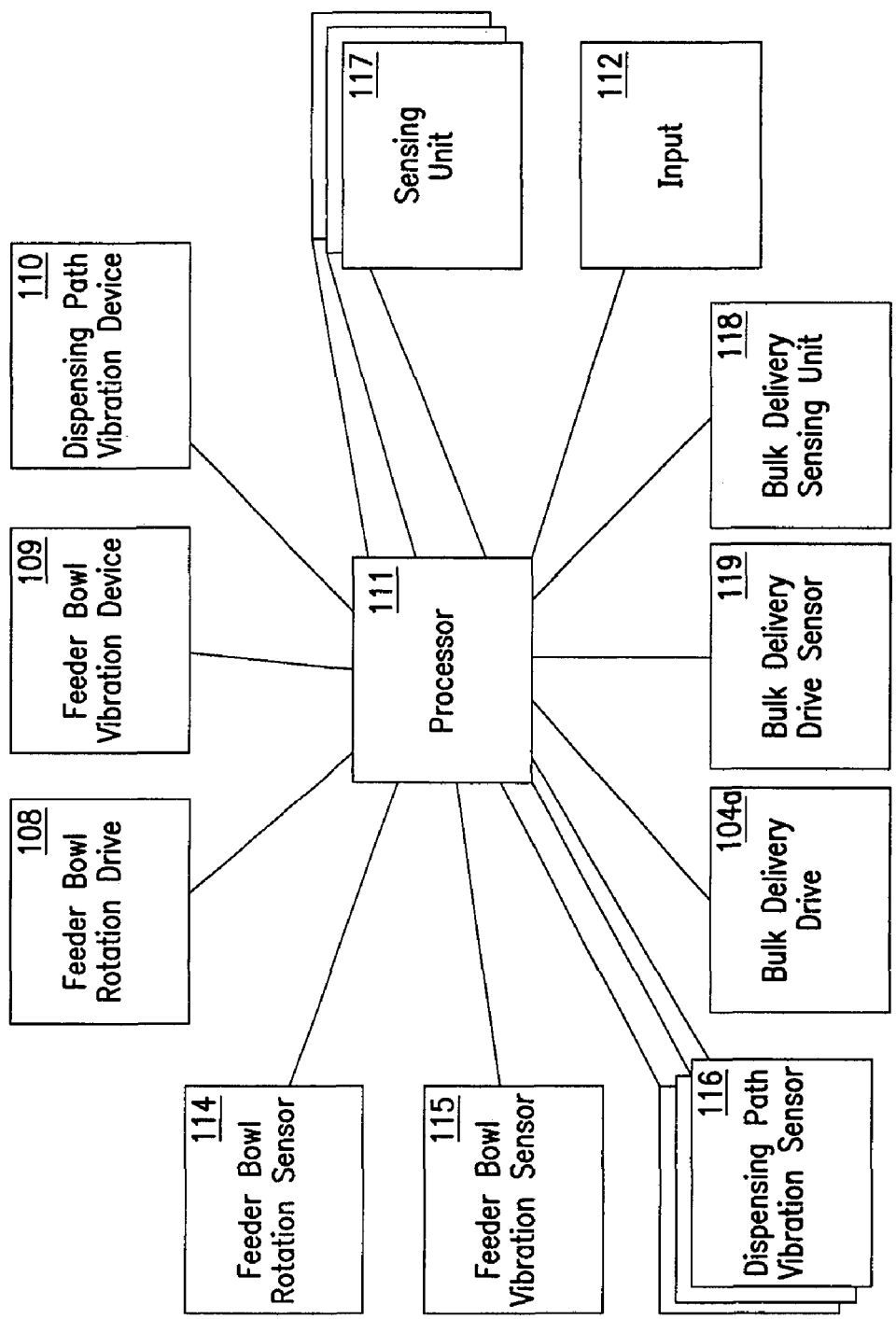
FIG. 3 shows a control system according to an embodiment of the present invention.

FIG. 3 shows a control system according to the present invention for use with a rotary, vibratory dispenser. The control system may include a processor 111, a memory (not shown), and an input device 112. Processor 111 may be a microprocessor, a general purpose program logic control (PLC), or the like. Memory may be separate from processor 111, or memory may be included with processor 111, or both. Input device 112 may include a keyboard, a touch screen interface, a wireless I/O communication port, or the like. Processor 111 may be positioned on rotary, vibratory dispenser 100, e.g., on a frame of rotary, vibratory dispenser 100.

A plurality of rotational and vibrational settings for each of feeder bowl rotation drive 108, feeder bowl vibration device 109, dispensing path vibration device 110, and may be stored in the control system. For example, memory may store one or more rotational speed settings for feeder bowl rotation drive 108. Feeder bowl 102 rotational speed settings may correspond to a desired rate of filling containers at rotary, vibratory dispenser 100, a desired rate of delivery of items from bulk delivery apparatus 104 to feeder bowl 102, or to a desired rate of dispensing items from dispensing paths 103. In embodiments of the invention in which feeder bowl rotation drive 108 rotates dispensing paths 103, memory may store one or more rotational speed settings for dispensing paths 103. The rotational speed settings may correspond to a desired rate of filling containers at rotary, vibratory dispenser 100.

Vibrational settings for feeder bowl vibration device 109 may be stored in memory. Each vibrational setting may include a magnitude of vibration, a frequency of vibration, or both, in a first plane, in a second plane, or both. Each vibrational setting may correspond to a rate at which bulk delivery apparatus 104 delivers items to rotary, vibratory dispenser 100, a rate of supplying items from feeder bowl 102 to dispensing paths 103, or both. Each vibrational setting may be proportionate to a physical characteristic, e.g., a volume, a density, a temperature, a weight, or the like, of items to be dispensed.

Vibrational settings for dispensing path vibration devices 1109 may be stored in memory. Each vibrational setting may include a magnitude of vibration, a frequency of vibration, or both, in a first plane, in a second plane, or both. Each vibrational setting may correspond to a rate at which feeder bowl 102 supplies items to dispensing paths 103, a desired rate of dispensing items from each dispensing path 103, or both. Each vibrational setting may be proportionate to a physical characteristic, e.g., a volume, a density, a temperature, a weight, or the like, of items to be dispensed.

Vibrational settings for may be stored in memory. Each vibrational setting may include a magnitude of vibration, a frequency of vibration, or both, in a first plane, in a second plane, or both. Each vibrational setting may correspond to a rate at which bulk delivery apparatus 104 delivers items to feeder bowl 102, a desired rate of dispensing items from each dispensing path 103, or both. Each vibrational setting may be proportionate to a physical characteristic, e.g., a volume, a density, a temperature, a weight, or the like, of items to be delivered by bulk delivery apparatus 104.

A predetermined range of one or more physical characteristics of each item to be dispensed may be stored in memory. For example, a predetermined range of weights, densities, or volumes may be stored for a particular item. Processor 111 may use a particular predetermined range of one or more physical characteristics of an item to identify each dispensed item the measured value of which is within a predetermined range and to identify each dispensed items the measured value of which is greater than or less than the predetermined range for that item. For example, each sensing unit 117 may measure a volume of each item dispensed from a dispensing path 103 or item-dispensing channel and transmit each measurement to control unit. Control unit may compare each measurement to a predetermined range of volumes for that particular item to determine whether the measured volume of each item is within the predetermined range of volumes for that particular item, or whether the measured volume for an item is greater than or less than the predetermined range of volumes for the item.

By receiving a measurement of a physical characteristic of a dispensed item from sensing unit 117 and comparing each measurement with a predetermined range for that physical characteristic, processor 111 may identify each item the measured physical characteristic of which is within specification, i.e., within a predetermined range for that item. This identification enables processor 111 to control dispensing of items, e.g., via control of dispensing heads 105, so that each dispensing head 105 may direct predetermined quantities of items, the measured physical characteristic of each of which is within a predetermined range for that item, to a container. Moreover, processor 111 may control dispensing heads 105, so that each dispensing head 105 may divert items the measured value of which is greater than or less than a predetermined range for that item away from a container. Comparison of a measurement of a physical characteristic of a dispensed item to a predetermined range for that physical characteristic enables processor 111 to determine whether each dispensing path 103 is dispensing items singularly.

Processor 111 may receive instructions from one or more input devices 112. Input device 112 may enable remote control of, and communication with, processor 111. Input device 112 may enable selection of one or more operational settings of rotary, vibratory dispenser 100, e.g., selection of rotational speed of feeder bowl rotation drive 108, selection of a vibrational magnitude and frequency in one or more planes of feeder bowl vibration device 109 or dispensing path vibration device 110, so that rotary, vibratory dispenser 100 may be operated at a variety of operational settings.

Each operational setting may be stored in a memory of control system and selected via input device 112. For example, input device 112 may enable selection of a rotational speed of feeder bowl 102, a rotational speed of dispensing paths 103, a vibrational magnitude and frequency of feeder bowl 102 in one or more planes, a vibrational magnitude and frequency of one or more dispensing paths 103 in one or more planes, or the like. Selection of these operational settings via input device 112 enables processor 111 to control a rotational speed of feeder bowl rotation drive 108, a vibrational magnitude and frequency of feeder bowl vibration device 109, one or more vibrational magnitudes or frequencies of dispensing path vibration devices 110, a drive setting for, or the like. Input device 112 may enable entry of various operational settings in addition to selection of operational settings stored in memory. Input device 112 may enable modification of stored operational settings, as well. Input device 112 also enables selection of a desired dispensing rate, a desired fill rate for containers, or the like.

Referring to FIG. 3, processor 111 may communicate with feeder bowl rotation drive 108, feeder bowl vibration device 109, dispensing path vibration devices 110, and, via various communication means, e.g., hard wire, wireless transmission, or the like, or a combination of these communication means, so that processor 111 may control operation of rotary, vibratory dispenser 100. Moreover, processor 111 may communicate with a feeder bowl rotation sensor 114, a feeder bowl vibration sensor 115, dispensing path vibration sensors 116, sensing units 117 and a bulk delivery sensor 104b that detects, e.g., weighs, counts, or the like, items delivered from bulk delivery apparatus 104 to rotary, vibratory dispenser 100.

Feeder bowl rotation sensor 114 detects, e.g., measures, a rotational speed of feeder bowl 102. Rotation sensor 114 may detect a rotational speed of feeder bowl 102 directly, e.g., by being positioned adjacent to feeder bowl 102 to sense a rotation of feeder bowl 102, or indirectly, e.g., by being positioned at rotation drive 8 to detect a rotational speed of rotation drive 8. Rotation sensor 114 transmits signals corresponding to a rotational speed of feeder bowl 102 or a rotational speed of feeder bowl rotation drive 108, or both, to processor 111.

Feeder bowl vibration sensor 115 detects, e.g., measures, a vibration of feeder bowl 102. Feeder bowl vibration sensor 115 may detect a frequency of vibration of feeder bowl 102, a magnitude of vibration of feeder bowl 102, or both. Moreover, feeder bowl vibration sensor 115 may detect the frequency of vibration of feeder bowl 102, the magnitude of vibration of feeder bowl 102, or both, in a first plane, a second plane, or both. Feeder bowl vibration sensor 115 may be positioned in direct contact with feeder bowl 102 to measure a vibration of feeder bowl 102. Feeder bowl vibration sensor 115 may be positioned at feeder bowl vibration device 109 for measuring a vibration of feeder bowl vibration device 109. For example, feeder bowl vibration sensor 115 may transmit signals corresponding to one or more of a frequency of vibration, a magnitude of vibration, and a direction or plane of vibration of feeder bowl 102, or feeder bowl vibration device 109, or both to processor 111.

Dispensing path vibration sensors 116 may detect, e.g., measure, one or more of a frequency of vibration of each dispensing path 103, a magnitude of vibration of each dispensing path 103, or a direction of vibration of each dispensing path 103. Moreover, each dispensing path vibration sensor 116 may detect a frequency of vibration of dispensing paths 103, a magnitude of vibration of dispensing paths 103, or both, in a first plane, a second plane, or both. Each dispensing path vibration sensor 116 may detect a vibration of one or more dispensing paths 103. Dispensing path vibration sensors 116 may measure a vibration of each dispensing path 103 directly, e.g., by being positioned at a dispensing path 103. Dispensing path vibration sensors 116 may measure a vibration of each dispensing path 103 indirectly, e.g., by being positioned at a dispensing path vibration device 110 to measure a vibration of each dispensing path vibration device 110.

If a dispensing path 103 includes two or more item-dispensing channels, a dispensing path vibration sensor 116 may measure a vibration of each item-dispensing channel directly, indirectly, or both. If each dispensing path vibration device 110 vibrates multiple channels, dispensing path vibration sensors 116 may measure a vibration of each individual channel or a vibration of the multiple channels vibrated by a respective dispensing path vibration device 110. Each dispensing path vibration sensor 116 transmits signals corresponding to measured vibrations of one or more dispensing paths 103, dispensing path vibration devices 110, or both, to processor 111. Moreover, dispensing path vibration sensors 116 may transmit signals corresponding to one or more of a frequency of vibration, a magnitude of vibration, and a direction of vibration of one or more channels of each dispensing path 103 to processor 111.

Sensing units 117 may measure a physical characteristic, e.g., a weight, a volume, a density, or the like, of each dispensed item and transmit signals corresponding to the measurements of each dispensed item to processor 111. Sensing units 117 may be positioned at each dispensing path 103, e.g., adjacent to a distal end of each dispensing path to measure items dispensed from each dispensing path 103. In an embodiment of the present invention, sensing units 117 may be positioned at a dispensing head 105, e.g., at an opening of a dispensing head 105, as shown in FIG. 1, to measure items received by dispensing head 105. Sensing units 117 may be positioned at a distal end of each item-dispensing channel of each dispensing path 103.

Sensing units 117 may include inductive sensors, capacitative sensors, photoelectric sensors, optical sensors, electromagnetic radiation sensors, proximity switches, or the like for measuring one or more physical characteristic of each dispensed item. For example, an electromagnetic radiation sensor or an optic sensor, such as those available from Batching Systems, Inc., Prince Frederick, Md., may measure a volume of each dispensed item by directing electromagnetic radiation from a source of electromagnetic radiation onto a detector and calculating a volume of each item passing between the electromagnetic source and detector based on a change in the amount of electromagnetic radiation detected by the detector as each item passes between the electromagnetic source and the detector. Such sensing units 117 are disclosed, e.g., in U.S. Pat. No. 5,454,016 to Holmes and U.S. Pat. No. 5,313,508 to Ditman et al., the contents of both patents are incorporated herein by reference in their entirety.

Sensing units 117 may include a scale, e.g., a strain gauge, for measuring a weight of each singularly-dispensed item. Further, sensing units 117 may include an optic sensor or scanning unit for measuring a volume of each singularly-dispensed item. Sensing units 117 may include a proximity switch for detecting each singularly-dispensed to provide a count of each dispensed item.

According to another embodiment of the invention, a pair of sensing units 117 may be positioned at each dispensing path 103 or item-dispensing channel. Each pair of sensing units 117 may measure two physical characteristics of each dispensed item. For example, a pair of sensing units 117 may measure a weight and a volume of a each dispensed item, so that processor 111 may calculate a density of each dispensed item. Thus, this dual sensing unit may further improve an accuracy of a count, or a measurement, or both of each dispensed item.

Processor 111 also may control operation of bulk delivery apparatus 104. For example, processor 111 may communicate with a bulk delivery sensing unit 18, e.g., a scale, or the like, and a bulk delivery drive sensor 19, e.g., a sensor positioned at a bulk delivery drive 104a of bulk delivery apparatus 104. Bulk delivery sensing unit 18 may transmit signals corresponding to a physical characteristic, e.g., a weight, a volume, a count, or the like, of items contained within bulk delivery apparatus or items delivered from bulk delivery apparatus 104, or both, so that processor 111 may calculate a quantity of items delivered by bulk delivery apparatus 104 to rotary, vibratory dispenser. Moreover, bulk delivery drive sensor 19 may transmit signals corresponding to a vibration, a rotational speed, or the like of bulk delivery drive 104a, so that processor 111 may control a rate at which bulk delivery apparatus 104 delivers items to rotary, vibratory feeder, e.g., to feeder bowl 102 of rotary, vibratory dispenser. Processor 111 may receive an input of one or more settings of bulk delivery drive 104a, so that processor 111 may control delivery of items from bulk delivery apparatus 104 to feeder bowl 102 to correspond to a desired or expected rate of dispensing items from rotary, vibratory dispenser.

Figure 5:
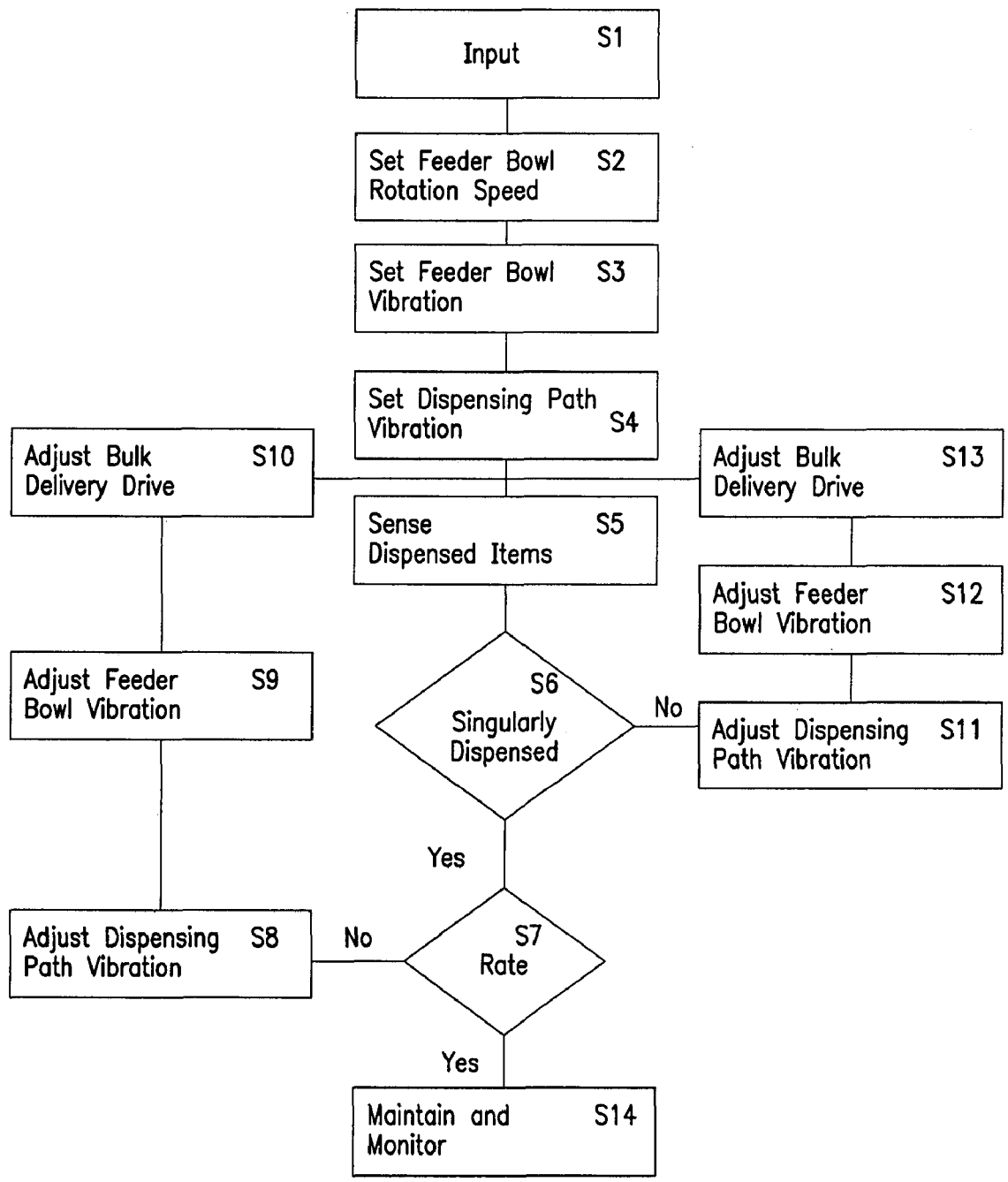
FIG. 5 shows a flow chart of a control method according to an embodiment of the present invention.

With reference to FIG. 5, a control program, e.g., a control routine, is disclosed. Processor 111 receives input, e.g., via input device 112, regarding one or more operational settings of rotary, vibratory dispenser (step S1). In one embodiment of the invention, the settings may be preset and stored in a memory of processor 111, so that one or more settings may be selected by input device 112. Alternatively, settings for one or more of feeder bowl rotation drive 108, feeder bowl vibration device 109, dispensing path vibration device 110, bulk delivery drive 104a may be entered into processor 111, via input device 112.

Feeder bowl rotational drive settings (step S8) may correspond to a desired or expected fill rate of containers to be received and filled at rotary, vibratory dispenser. Feeder bowl vibrational settings (step S9) may be dictated or driven by a physical characteristic of items to be dispensed, a rotational speed of feeder bowl 102, a rate of delivery of items from bulk delivery device 4, or a desired rate of supplying items from feeder bowl 102 to each dispensing path 103.

Dispensing path vibrational settings (step S3) may be dictated or driven by a physical characteristic of items to be dispensed or to a desired dispensing rate of items. In response to the input settings, processor 111 may control operation of feeder bowl rotation drive 108, feeder bowl vibration device 109, dispensing path vibration device 110, and bulk delivery drive 104a (not shown), so that rotary, vibratory dispenser receives a plurality of items and dispenses the items singularly from each dispensing path 103.

Moreover, processor 111 may continuously monitor and regulate, e.g., via a control routine, feed back loop, or the like (not shown), feeder bowl rotation drive 108, feeder bowl vibration device 109, and dispensing path vibration devices 110, in response to signals received from feeder bowl rotation sensor 114, feeder bowl vibration sensor 115, and dispensing path vibration sensor 116, so that feeder bowl rotation drive 108, feeder bowl vibration device 109, and dispensing path vibration devices 110 operate at desired operational settings.

Sensing units 117 measure a physical characteristic of each item dispensed from each dispensing path 103 or item-dispensing channel and transmit signals corresponding to each measurement to processor 111 (step S5). Based on these received signals, processor 111 determines, for each dispensing path 103, whether items are being dispensed singularly (step S6). If processor 111 determines that items are being dispensed singularly from each dispensing path 103, processor 111 next determines whether items may be dispensed singularly at an increased rate (step S7).

If processor 111 determines that items may be dispensed singularly at an increased rate, processor 111 adjusts one or more of bulk delivery drive 104a (step S10), feeder bowl vibration device 109 (step S9), or dispensing path vibration devices 110 (step S8), so that items may be dispensed singularly at an increased rate. Processor 111 then receives signals from sensing units 117 corresponding to each item or items dispensed from each dispensing path 103 (step S5) and determines whether items are being dispensed singularly from each dispensing path 103 at the increased dispensing rate.

If processor 111 determines that items are not being dispensed singularly, e.g., if processor 111 receives measurements from sensing unit 117 indicating that items are being dispensed in pairs or in an overlapped relationship from one or more dispensing paths 103 (step S6), processor 111 may adjust one or more of bulk delivery drive 104a (step S13), feeder bowl vibration device 109 (step S12), or dispensing path vibration devices 110 (step S11), so that items may be dispensed singularly from each dispensing path 103. For example, processor 111 may adjust bulk delivery drive 104a (step S13) to reduce the rate at which items are delivered to feeder bowl 102. Alternatively or additionally, processor 111 may adjust feeder bowl vibration device 109 (step S12), or one or more dispensing path vibration devices 110 (step S11), so that items may be delivered uniformly from feeder bowl 102 to dispensing paths 103 and so that each dispensing path 103 may dispense items singularly.

In response to measurements received from sensing units 117, processor 111 may continue to adjust one or more of bulk delivery drive 104a (step S13), feeder bowl vibration device 109 (step S12), or dispensing path vibration devices 110 (step S11), as necessary, until items are dispensed singularly from each dispensing path 103. Moreover, processor 111 may adjust a frequency of vibration, a magnitude of vibration, or both, in a first direction, a second direction, or both, of feeder bowl vibration device (step S12), dispensing path vibration devices 110 (step S11), and bulk delivery drive 104a (step S13) (if applicable), so that dispensing paths 103 dispense items singularly, e.g., in response to signals received from sensing units 117. Once processor 111 determines that items are dispensed singularly from each dispensing path 103, processor 111 continues to monitors operation of rotary, vibratory dispenser (step S14).

Processor 111 also counts each item dispensed from each dispensing path 103, so that predetermined quantities of items may be directed to containers or packages. For example, processor 111 may count each item dispensed from a dispensing path 103 or channel to a respective dispensing head 105 and activate each respective dispensing head 105 to direct predetermined quantities of items, the measured physical characteristic of each of which items is within a predetermined range of physical characteristics, to a container or package.

Processor 111 may activate a dispensing head 105 to divert quantities of items in which at least one item has a measured physical characteristic that is greater than or less than a predetermined range of physical characteristics, so that containers or packages are not filled with defective items, e.g., items whose weight, volume, shape is not within a predetermined range of measurements. Alternatively, processor 111 may increment a count of a predetermined quantity of items for each item the measured physical characteristic of which is greater than or less than a predetermined range of physical characteristics, so that dispensing heads 105 dispense at least a predetermined quantity of items, each with a measured physical characteristic that is within a predetermined range of physical characteristics.

In a further embodiment of the present invention, processor 111 may define a predetermined range of physical characteristics for one or more physical characteristics of an item to be dispensed by rotary, vibratory dispenser 100. For example, processor 111 may operate rotary, vibratory dispenser 100 to dispense items singularly from each dispensing path 103 and measure a physical characteristic of each singularly-dispensed item. Processor 111 may then establish a predetermined range of physical characteristics of one or more physical characteristics of each dispensed item based on the measure values of each item transmitted to processor 111 from sensing units 117. Moreover, processor 111 may store define predetermined range in a memory for future use.

Figure 7:
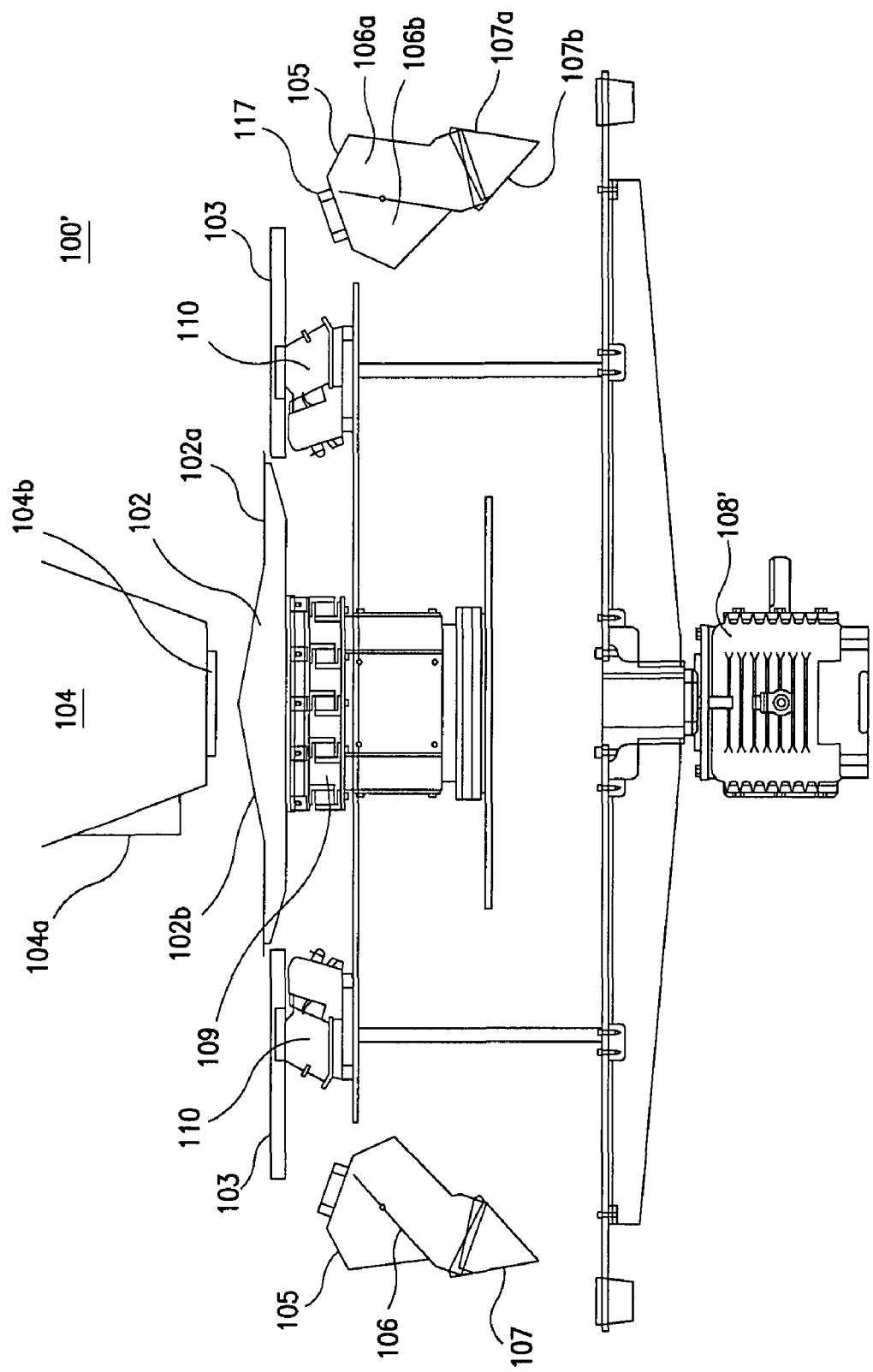
FIG. 7 shows a dispenser for use with a control system, according to another embodiment of the present invention.

Referring to FIG. 7, a dispenser 100' for use with the control system of the present invention is depicted. The features and advantages of dispenser 100' are substantially similar to the features and advantages of dispenser 100. Therefore, the similar features and advantages of dispenser 100 and dispenser 100' are not discussed further with respect to dispenser 100'. Dispenser 100' may comprise feeder bowl 102, dispensing paths 103 positioned around feeder bowl 102, a dispensing path rotation drive 108' for rotating dispensing paths 103, feeder bowl vibration device 109, and the one or more dispensing path vibration devices 110 for vibrating each dispensing path 103. In this embodiment of the present invention, feeder bowl vibration device 109 may vibrate feeder bowl 102, the one or more dispensing path vibration devices 110 may vibrate dispensing paths 103, and dispensing path rotation drive 108' may rotate dispensing paths 103 around feeder bowl 102. For example, an edge of dispensing paths 103 may be positioned below and may overlap a portion of feeder bowl 102, such that at least one vertical plane includes both dispensing paths 103 and feeder bowl 102. Moreover, in this embodiment of the present invention, feeder bowl 102 does not rotate. Consequently, a lighter motor may be used, there are fewer moving parts is dispenser 100', and dispenser 100' may have increased control.

While the invention has been described in connection with preferred embodiments, it will be understood by those of ordinary skill in the art that other variations and modifications of the preferred embodiments described above may be made without departing from the scope of the invention. Moreover, other embodiments of the present invention will be apparent to those of ordinary skill in the art from a consideration of the specification or a practice of the invention disclosed herein, or both.

What is claimed is:

1. A control system for regulating a dispenser comprising a feeder bowl and a plurality of dispensing paths comprises:
a control unit for controlling each of a feeder bowl vibration device for vibrating said feeder bowl, a rotation drive for rotating said dispensing paths, and at least one dispensing path vibration device for vibrating said dispensing paths, such that said feeder bowl receives a plurality of items and supplies those items uniformly to each of said dispensing paths, and said dispensing paths dispense said items singularly.

2. The control system of claim 1, wherein said control unit controls a rotational speed of said rotation drive, a vibration of said feeder bowl vibration device, and a vibration of said at least one dispensing path vibration device.

3. The control system of claim 1, wherein said control unit controls a rotational speed of said rotation drive according to a desired number of containers to be filled by said dispenser, and a vibration of said feeder bowl vibration device and said at least one dispensing path vibration device according to said rotational speed and a physical characteristic of each of said items to be dispensed, such that said dispensing paths dispense said items singularly.

4. The control system of claim 1, wherein said at least one dispensing path vibration device comprises a plurality of dispensing path vibration devices, each of said dispensing path vibration devices vibrating one of said dispensing paths, and further wherein said control unit controls a vibration of said feeder bowl vibration device and each of said dispensing path vibration devices, such that said dispensing paths dispense said items singularly.

5. The control system of claim 4, wherein each of said dispensing paths comprises at least one channel for dispensing items singularly and each of said channels has a substantially V-shaped or U-shaped cross-section.

6. The control system of claim 1, wherein said control unit controls a vibration of said feeder bowl vibration device and said at least one dispensing path vibration device in a substantially horizontal plane.

7. The control system of claim 1, wherein said control unit controls a vibration of said feeder bowl vibration device and said at least one dispensing path vibration device in a substantially vertical plane.

8. The control system of claim 1, wherein said control unit controls a vibration of said feeder bowl vibration device and said at least one dispensing path vibration device in a first plane and a second plane and wherein said first plane and said second plane are transverse to one another.

9. The control system of claim 1, wherein said control unit controls a frequency of vibration of said feeder bowl vibration device and said at least one dispensing path vibration device.

10. The control system of claim 1, wherein said control unit controls a frequency of vibration of said feeder bowl vibration device and said at least one dispensing path vibration device in a first plane and a second plane.

11. The control system of claim 1, wherein said control unit controls a magnitude of vibration of said feeder bowl vibration device and said at least one dispensing path vibration device.

12. The control system of claim 1, wherein said control unit controls a magnitude of vibration of said feeder bowl vibration device and said at least one dispensing path vibration device in a first plane and a second plane.

13. The control system of claim 1, wherein said control unit controls a frequency and a magnitude of vibration of said feeder bowl vibration device and said at least one dispensing path vibration device in a first plane and a second plane.

14. The control system of claim 1, further comprising:
a memory for storing a plurality of vibrational settings for said feeder bowl vibration device and said at least one dispensing path vibration device, wherein each of said vibrational settings is proportionate to a physical characteristic of said items to be dispensed; and
an input unit for selecting one of said vibrational settings and transmitting said vibrational setting to said control unit,
wherein said control unit adjusts a vibration of said feeder bowl vibration device and a vibration of said at least one dispensing path vibration device, so that said feeder bowl dispenses said items uniformly and said dispensing paths dispense said items singularly.

15. The control system of claim 14, wherein said vibrational setting comprises:
a first vibrational setting for said feeder bowl vibration device; and
a second vibrational setting for said at least one dispensing path vibration device.

16. The control system of claim 15, wherein said first vibrational setting comprises a first vibrational frequency and a first vibrational magnitude and said second vibrational setting comprises a second vibrational frequency and a second vibrational magnitude.

17. The control system of claim 1, further comprising:
a memory for storing a plurality of rotational speed settings for said rotation drive; and
an input unit for selecting one of said rotational speed settings and transmitting said rotational speed setting to said control unit,
wherein said control unit adjusts a rotational speed of said rotation drive, in response to said selected setting.

18. The control system of claim 1, further comprising:
a first vibration sensor for measuring a first vibration component generated by said feeder bowl vibration device and transmitting signals describing, said first vibration component to said control unit;
a second vibration sensor for measuring a second vibration component generated by said at least one dispensing path vibration device and transmitting signals describing said second vibration component to said control unit;
a rotation sensor for measuring a rotational speed of said rotation drive and transmitting signals describing said rotational speed to said control unit; and a sensing unit positioned at a distal end of each of said dispensing paths for counting each of said singularly-dispensed items and transmitting said count to said control unit, wherein said control unit controls said first vibration component of said feeder bowl vibration device and said second vibration component of said at least one dispensing path vibration device, and a rotational speed of at least one of said rotation drive and said dispensing paths, in response to said signal received from each of said sensors and said count received from said sensing unit, such that said dispensing paths dispense said items singularly.

19. The control system of claim 1, further comprising:
a sensing unit positioned at a distal end of each of said dispensing paths, said sensing unit measuring a physical characteristic of each of said singularly-dispensed items and transmitting each of said measurements to said control unit.

20. The control system of claim 19, wherein said control unit determines whether each of said measurements describes a singularly-dispensed item and controls a vibration component of said feeder bowl vibration device and said at least one dispensing path vibration device, so that said dispensing paths dispense said items singularly.

21. The control system of claim 19, wherein said control unit determines whether each of said measurements corresponds to a singularly-dispensed item and controls a vibration of said feeder bowl and said dispensing paths, so that said dispensing paths dispense said items singularly.

22. The control system of claim 19, wherein said physical characteristic comprises at least one of a volume, a density, and a weight.

23. The control system of claim 1, wherein said control unit adjusts a rotational speed of said rotation drive and a frequency and a magnitude of vibration of said feeder bowl vibration device and said at least one dispensing path vibration device, so that said dispensing paths dispense said items singularly.

24. The control system of claim 1, further comprising:
a sensing unit positioned at a distal end of each of said dispensing paths, wherein said sensing unit measures a physical characteristic of each of said singularly-dispensed items and transmits each of said measurements to said control unit,
wherein said control unit counts each of said items whose measurement is within a predetermined range of physical characteristics and identifies each of said items whose measurement is greater than or less than said predetermined range of physical characteristics.

25. The control system of claim 24, wherein said control unit counts each of said items in groups of predetermined quantities for each of said dispensing paths and identifies any of said groups of items comprising at least one item the measurement of which is greater than or less than said predetermined range of physical characteristics.

26. The control system of claim 25, wherein said control unit identifies for diversion any of said groups of predetermined quantities in which at least one of said items comprises a measurement greater than or less than said predetermined range of physical characteristics.

27. The control system of claim 1, further comprising:
a sensing unit positioned at a distal end of each of said dispensing paths, said sensing unit measuring a physical characteristic of each of said singularly-dispensed items and transmitting each of said measurements to said control unit; and a dispensing head positioned at said distal end of each of said dispensing paths to receive said singularly-dispensed items,
wherein said control unit counts each of said items whose measurement is within a predetermined range of physical characteristics, collects said items into groups of predetermined quantities, and activates said dispensing head to direct said predetermined quantity of items to a container.

28. The control system of claim 1, further comprising:
a plurality of dispensing heads for receiving said singularly-dispensed items; and
a plurality of sensing units for measuring a physical characteristic of each of said dispensed items and each measurement to said control unit,
wherein said control unit counts each of said items whose measurement is within a predetermined range of physical characteristics, collects said items into in groups of predetermined quantities, and activates each of said dispensing heads to dispense said groups of predetermined quantities.

29. A method of controlling the dispensing items comprising the steps of:
delivering items onto a feeder bowl at a predetermined rate of delivery;
rotating a feeder bowl at a predetermined rotational speed;
vibrating said feeder bowl at a predetermined feeder bowl vibrational setting, so that said items are dispensed uniformly to a plurality of dispensing paths positioned around said feeder bowl;
rotating said dispensing paths at a predetermined rotational speed; and
vibrating said dispensing paths at a predetermined dispensing path vibrational setting, so that said dispensing paths dispense said items singularly.

30. The method of claim 29, wherein the steps of vibrating said feeder bowl and said dispensing paths comprises the steps of:
operating a feeder bowl vibration device at said predetermined feeder bowl vibrational setting; and
operating at least one dispensing path vibration device at said predetermined dispensing path vibrational setting.

31. The method of claim 29, wherein the step of rotating said feeder bowl further comprises the steps of:
operating a feeder bowl rotation drive at said predetermined rotational speed.

32. The method of claim 29, wherein the step of vibrating said dispensing paths comprises the step of vibrating each, of said dispensing paths at said predetermined dispensing path vibrational setting.

33. The method of claim 29, wherein the step of vibrating said feeder bowl at a predetermined feeder bowl vibrational setting comprises the step of:
vibrating said feeder bowl in a first plane and a second plane,
wherein said first plane and said second plane are transverse.

34. The method of claim 29, wherein the step of vibrating said dispensing paths at a predetermined dispensing path vibrational setting comprises the step of:
vibrating each of said dispensing paths in a first plane and a second plane,
wherein said first plane and said second plane are transverse.

35. The method of claim 29, wherein the step of vibrating said feeder bowl at a predetermined feeder bowl vibrational setting comprises the step of:

vibrating said feeder bowl in a substantially horizontal plane and a substantially vertical plane.

36. The method of claim 29, wherein the step of vibrating said dispensing paths at a predetermined dispensing path vibrational setting comprises the step of:
    vibrating each of said dispensing paths in a substantially horizontal plane and a substantially vertical plane.

37. The method of claim 29, wherein the steps of vibrating said feeder bowl at a predetermined feeder bowl vibrational setting and vibrating said dispensing paths at a predetermined dispensing path vibrational setting comprises the steps of vibrating said feeder bowl and said dispensing paths at predetermined respective vibrational frequencies.

38. The method of claim 29, wherein the steps of vibrating said feeder bowl at a predetermined feeder bowl vibrational setting and vibrating said dispensing paths at a predetermined dispensing path vibrational setting comprises the steps of vibrating said feeder bowl and said dispensing paths at predetermined respective vibrational magnitudes.

39. The method of claim 29, wherein said steps of vibrating said feeder bowl at a predetermined feeder bowl vibrational setting and vibrating said dispensing paths at a predetermined dispensing path vibrational setting comprises the steps of:
    retrieving a predetermined feeder bowl vibrational setting and a predetermined dispensing path vibrational setting from a memory;
    operating a feeder bowl rotation drive at said predetermined feeder bowl vibrational setting; and
    operating a dispensing path vibration device at said predetermined dispensing path vibrational setting,
    wherein each of said vibrational settings is proportionate to a physical characteristic of each of said items to be dispensed.

40. The method of claim 39, further comprising the steps of:
    measuring a physical characteristic of each of said items dispensed from each of said dispensing paths; and
    adjusting each of said vibrational settings, so that said dispensing paths dispense said items singularly.

41. The method of claim 39, wherein the step of retrieving a predetermined feeder bowl and dispensing path vibrational setting comprises the steps of:
    retrieving a predetermined vibrational frequency and magnitude for said feeder bowl and a predetermined vibrational frequency and magnitude for each of said dispensing paths, wherein each of said predetermined vibrational frequencies and magnitudes is proportionate to a density of each of said items to be dispensed.

42. The method of claim 39, wherein the step of retrieving a predetermined feeder bowl and dispensing path vibrational setting comprises the steps of:
    retrieving a predetermined vibrational frequency and magnitude for said feeder bowl and a predetermined vibrational frequency and magnitude for each of said dispensing paths, wherein each of said predetermined vibrational frequencies and magnitudes is proportionate to a volume of each of said items to be dispensed.

43. The method of claim 39, wherein the step of retrieving a predetermined feeder bowl and dispensing path vibrational setting comprises the steps of:
    retrieving a predetermined vibrational frequency and magnitude for said feeder bowl and a predetermined vibrational frequency and magnitude for each of said dispensing paths, wherein each of said predetermined vibrational frequencies and magnitudes is proportionate to a weight of each of said items to be dispensed.

44. The method of claim 29, further comprising the steps of:
    measuring a vibrational component of said feeder bowl and transmitting said measurements to a control unit;
    measuring a vibrational component of each of said dispensing paths and transmitting said measurements to said control unit;
    measuring a rotational speed of said feeder bowl and transmitting said measurements to said control unit;
    counting each of said singularly-dispensed items and transmitting said count to said control unit;
    adjusting said vibration of said feeder bowl and each of said dispensing paths and said rotational speed of said feeder bowl, in response to said count, so that said dispensing paths dispense said items singularly.

45. The method of claim 30, further comprising the steps of:
    measuring a vibrational component of a feeder bowl vibration device that vibrates said feeder bowl and transmitting said measurements to a control unit;
    measuring a vibrational component of a dispensing path vibration device that vibrates each of said dispensing paths and transmitting said measurements to said control unit;
    measuring a rotational speed of a rotation drive that rotates said feeder bowl and transmitting said measurements to said control unit;
    counting each of said singularly-dispensed items and transmitting said count to said control unit;
    operating said feeder bowl vibration device said dispensing path vibration device, in response to said count, so that said dispensing paths dispense said items singularly.

46. The method of claim 29, further comprising the steps of:
    counting each of said singularly-dispensed items;
    transmitting said count to said control unit; and
    adjusting said predetermined vibrational settings of said feeder bowl and each of said dispensing paths, and said predetermined rotational speed setting of said feeder bowl, in response to said count, so that said dispensing paths dispense said items singularly.

47. The method of claim 29, further comprising the steps of:
    counting each of said singularly-dispensed items;
    transmitting said count to said control unit; and
    controlling a vibration of a feeder bowl vibration device of said feeder bowl and a dispensing path vibration device of each of said dispensing paths, in response to said count, so that said dispensing paths dispense said items singularly.

48. The method of claim 29, further comprising the step of:
    measuring a physical characteristic of each of said singularly-dispensed items; and
    transmitting said measurements to a control unit.

49. The method of claim 48, further comprising the steps of:
    determining whether each of said measurements corresponds to a singularly-dispensed item; and
    adjusting said predetermined vibrational settings of said feeder bowl and each of said dispensing paths, in response to said measurements, so that said dispensing paths dispense said items singularly.

50. The method of claim 48, wherein the step of measuring a physical characteristic of each of said singularly-dispensed items comprises the step of measuring at least one of a volume of each of said singularly-dispensed items, a density of each of said singularly-dispensed items, and a weight of each of said singularly-dispensed items.

51. The method of claim 29, further comprising the steps of:
    measuring a physical characteristic of each of said singularly-dispensed items;
    transmitting each of said measurements to a control unit; and
    counting each of said items whose measurement is within a predetermined range of physical characteristics; and
    identifying each of said items whose measurement is greater or less than said predetermined range of physical characteristics.

52. The method of claim 29, further comprising the steps of:
    measuring a physical characteristic of each of said singularly-dispensed items;
    transmitting each of said measurements to a control unit;
    receiving said singularly-dispensed items in a dispensing head positioned at a distal end of each of said dispensing paths;
    counting each of said items whose measurement is within a predetermined range of physical characteristics in groups of predetermined quantities; and
    identifying any of said predetermined quantities with at least one item whose measurement is greater or less than said predetermined range.

53. The method of claim 52, further comprising the step of:
    activating said dispensing head to direct said predetermined quantities in which each of said items has a measurement within said predetermined range of physical characteristics to a container.

54. The method of claim 52, furthercomprising the step of:
    activating said dispensing head to divert any of said predetermined quantities in which each of said items has a measurement that is greater than or less than said predetermined range of physical characteristics away from a container.

55. A control system for regulating a rotary, vibratory dispenser comprising a feeder bowl and a plurality of dispensing paths comprises:
    a control unit for controlling each of a rotation drive for rotating said feeder bowl, a feeder bowl vibration device for vibrating said feeder bowl, and at least one dispensing path vibration device for vibrating said at least one dispensing path, and a rotation drive for rotating said at least one dispensing path, so that said feeder bowl may receive a plurality of items and supplies those items uniformly to each of said dispensing paths, and so that said dispensing paths dispense said items singularly.

* * * * *